United States Patent
Huang et al.

(10) Patent No.: US 9,554,322 B2
(45) Date of Patent: Jan. 24, 2017

(54) TRANSMISSION CONTROL METHOD AND COMMUNICATION APPARATUS USING THE SAME FOR VEHICULAR AD HOC NETWORK SYSTEM

(71) Applicant: INSTITUTE FOR INFORMATION INDUSTRY, Taipei (TW)

(72) Inventors: Chung-Ming Huang, Kaohsiung (TW); Shih-Yang Lin, Changhua County (TW); Ching-Yuan Lin, Taoyuan County (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 332 days.

(21) Appl. No.: 14/088,396

(22) Filed: Nov. 23, 2013

(65) Prior Publication Data

US 2015/0092661 A1    Apr. 2, 2015

(30) Foreign Application Priority Data

Sep. 27, 2013  (TW) .............................. 102135015 A

(51) Int. Cl.
  *H04W 88/04*  (2009.01)
  *H04B 7/155*  (2006.01)
  (Continued)

(52) U.S. Cl.
  CPC ......... *H04W 40/026* (2013.01); *H04W 40/248* (2013.01)

(58) Field of Classification Search
  CPC .................................................. H04W 40/026
  (Continued)

(56) References Cited

U.S. PATENT DOCUMENTS

| 8,570,930 B2 * | 10/2013 | Kim ...................... H04W 40/20 370/313 |
| 2005/0094666 A1 * | 5/2005 | Biyens .................. H04W 99/00 370/473 |

(Continued)

FOREIGN PATENT DOCUMENTS

| CN | 102883263 A | 1/2013 |
| CN | 102916889 A | 2/2013 |
| WO | WO 2011/133016 A2 * | 10/2011 |

OTHER PUBLICATIONS

Taiwan Patent Office, Office action issued on Apr. 20, 2015.

*Primary Examiner* — Andrew Chriss
*Assistant Examiner* — Voster Preval
(74) *Attorney, Agent, or Firm* — Li & Cai Intellectual Property (USA) Office

(57) ABSTRACT

A transmission control method for a vehicular ad hoc network system having a plurality of mobile nodes is provided. The mobile nodes include a source node, a destination node, and a plurality of relay nodes. The source node transmits a data packet to the destination node through the relay nodes. The method includes each mobile node capturing mobility information being periodically broadcasted from neighboring mobile nodes to correspondingly update the connection state table thereof, wherein the connection state table records the coverage remaining time between the mobile node and neighboring mobile nodes; when any of relay nodes determines that the coverage remaining time between the relay node and the subsequent mobile node is less than a predefined threshold, the relay node transforms into a proxy node, stores the data packet, and establishes a reliable sub-connection between the proxy node and a next proxy node or the destination node.

16 Claims, 18 Drawing Sheets

(51) Int. Cl.
*H04W 16/26* (2009.01)
*H04W 40/02* (2009.01)
*H04W 40/24* (2009.01)

(58) Field of Classification Search
USPC .......................................................... 370/315
See application file for complete search history.

(56) References Cited

U.S. PATENT DOCUMENTS

| | | | | |
|---|---|---|---|---|
| 2010/0254294 | A1* | 10/2010 | Jerbi | H04L 12/189 370/312 |
| 2012/0106552 | A1* | 5/2012 | Iwao | H04L 45/36 370/392 |
| 2013/0094493 | A1* | 4/2013 | Batsuuri | H04W 74/0816 370/347 |
| 2013/0188513 | A1* | 7/2013 | Vasseur | H04W 40/248 370/254 |

* cited by examiner

TRANSMISSION CONTROL METHOD AND COMMUNICATION APPARATUS USING THE SAME FOR VEHICULAR AD HOC NETWORK SYSTEM

BACKGROUND

1. Technical Field

The present invention relates to a mobile communication network system, in particular, to a transmission control method for a vehicular ad hoc network system and a communication apparatus using the same.

2. Description of Related Art

The vehicular ad hoc network (VANET) refers a wireless ad hoc network concept that is derived from the mobile ad hoc network (MANET). The VANET is designed to provide data communication (e.g., video information, driving information, or the like) among nearby vehicles or between vehicles and roadside units in a wirelessly manner through on-board communication units installed on vehicles. The VANET can improve driving efficiency and the driving safety of vehicles, as well as prevent traffic accident in advance. The VANET has been widely used for constructing the traffic management system, the traveler information system, the vehicle control and safety system, the emergency management system, or the like.

The VANET uses moving vehicles or fixed roadside units as transmission nodes and wireless communication technology to form a mobile network for performing point-to-point transmission. Currently, the VANET adopts the transmission control protocol (TCP) and the split-TCP for vehicle-to-vehicle (V2V) communication or the vehicle-to-infrastructure (V2I) communication.

Please refer to FIG. 1A and FIG. 1B. FIG. 1A shows a diagram illustrating an operation of a VANET using a conventional TCP protocol. FIG. 1B shows a diagram illustrating an operation of the VANET using a split-TCP protocol.

As shown in FIG. 1A, the conventional TCP protocol can be used to provide a reliable transmission between a source node (i.e. the vehicle C1) and a destination node (i.e. the vehicle C10) in the VANET. The vehicle C1 utilizes a multi-hop transmission technique and forwards a packet to the vehicle C10 through a plurality of the relay nodes (i.e. the vehicle C2 to the vehicle C9) in sequence. Due to the movement of vehicle, the VANET system generally has fast changing network topology (e.g., the positions of nodes). However, the conventional TCP protocol is a communication protocol suitable for establishing communication with stationary nodes. In other words, the conventional TCP protocol is unable to adapt to the rapid network change of the VANET system. For example, when any vehicle leaves the VANET, the network connection between the source node (i.e. the vehicle C1) and the destination node (i.e. the vehicle C10) is instantly interrupted and the source node (i.e. the vehicle C1) has to search and establish a new network connection as well as retransmits the packet to the destination node (i.e. the vehicle C10), thereby introduces the end-to-end delays. Moreover, for the VANET that adopts the conventional TCP protocol, the channel capturing time associated with one channel could be greatly increased due to long transmission channel and high packet loss rate, thereby generating the channel capturing effect and decreasing the transmission efficiency of using the conventional TCP protocol in the VANET.

The split-TCP technique is brought to resolve the long transmission channel issue associated with the conventional TCP protocol. The split-TCP protocol places proxy nodes (e.g., the vehicles C4 and C7) at designated position and divides the network connection between the source node (i.e. the vehicle C1) and the destination node (i.e. the vehicle C10) into sub-connections SUB_1~SUB_3. Particularly, each of the sub-connections contains a fixed number of transmission nodes so that the number of hops (i.e. hop paths H1-H3) in each of the transmission paths is fixed. Taking a sub-connection SUB_1 as an example, the packet transmitted from the source node (i.e. the vehicle C1) to the proxy node (i.e. the vehicle C4) is routed through the hop path H1, the vehicle C2, the hop path H2, the vehicle C3, and the hop path H3.

Therefore, when any of the proxy nodes (e.g., the vehicle C5) leaves the VANET, the vehicle C4 (i.e. the proxy node) reestablishes a reliable transmission between the vehicle C4 and the destination node (i.e. the vehicle C10) without needing to reestablish the reliable transmission from the source node (i.e. the vehicle C1) to the destination node (i.e. the vehicle C10). Additionally, whenever a packet is lost during the packet transmission, the packet can be directly retransmitted from the preceding proxy node, thereby improve the packet transmission efficiency of the VANET.

However, since the distance between the source node (i.e. the vehicle C1) and the destination node (i.e. the vehicle C10) is fixed. Each proxy node (e.g., the vehicle C4, C7) further needs to temporarily store the packet and establishes a sub-connection with the subsequent proxy node or the destination node upon receiving the data packet. Thus, the more proxy nodes employed in a network connection (e.g., being divided into more sub-connections), the slower the transmission speed. In other words, the split-TCP protocol employs the proxy node to fixedly divide the connection into designated number of sub-connections. Hence the split-TCP protocol is still unable to adaptively to the rapid network change of the VANET.

SUMMARY

Accordingly, an objective of the present disclosure is to provide a transmission control method and a communication apparatus using the same for a vehicular ad hoc network system. The transmission control method implements a reliable split-TCP protocol scheme. The transmission control method can actively transforming any of the mobile nodes served as the relay nodes in the vehicular ad hoc network system into the proxy node based on the changes in the network topology (e.g., the position and the velocity of the mobile node) of the vehicular ad hoc network system. Such that the number of the proxy node and the associated positions in the vehicular ad hoc network system can be dynamically adjusted to increase the transmission efficiency of the vehicular ad hoc network system.

The present disclosure provides a transmission control method for a vehicular ad hoc network system, which has a plurality of mobile nodes with communication capability. The mobile nodes include a source node, a destination node, and a plurality of relay nodes. The transmission control method includes the following steps. Each of the mobile nodes periodically broadcasts a beacon message, wherein the beacon message includes a mobility information associated with each of the respective mobile nodes. Each of the mobile nodes receives the beacon message that is broadcasted from each of the neighboring mobile nodes and updates a connection state table associated with each of the mobile nodes correspondingly according to the beacon message. The connection state table is configured to record a coverage remaining duration between each mobile node itself and each of the neighboring mobile nodes. A network connection between the source node and the destination node is established such that the source node transmits a data packet to the destination node through the relay nodes. Each of the relay nodes determines whether the coverage remaining duration between the relay node and the subsequent mobile node is less than a predefined threshold according to the connection table upon receiving the data packet. When determined that the coverage remaining duration is less than the predefined threshold, the relay node transforms into a proxy node, stores the data packet, and establishes a first sub-connection with a subsequent proxy node or the destination node.

According to one exemplary embodiment of the present disclosure, the transmission method further includes the proxy node determining whether the coverage remaining duration between the proxy node and the subsequent mobile node is greater than the predefined threshold according to the connection state table upon receiving another data packet. When the proxy node determines that the coverage remaining duration between the proxy node itself and the subsequent mobile node is greater than the predefined threshold, the proxy node further determines whether the moving direction of the proxy node is the same as the moving direction of the subsequent mobile node. When the proxy node determines that the moving direction thereof is the same as the moving direction of the subsequent mobile node, the proxy node transforms into the relay node and forwards the data packet to the subsequent mobile node.

According to one exemplary embodiment of the present disclosure, wherein the steps of determining whether to transform the relay node into the proxy node or whether to transform the proxy node into the relay node can be executed by a network layer of the mobile node. The aforementioned steps of establishing the first sub-connection between the mobile node and the preceding proxy node or the source can be executed by a transport layer of the mobile node, wherein the transport layer is defined based on the wave short message protocol (WSMP).

The present disclosure further provides a communication apparatus for a mobile node of a vehicular ad hoc network system. The communication apparatus includes a positioning module, a speed detection module, a connection state table, a communication module, and a processing unit. The positioning module is configured to operatively generate a positioning signal associated with the location of the mobile node. The speed detection module is configured for operatively detecting a speed of the mobile node and generating a speed information, accordingly. The connection state table is stored in a memory unit and is configured for recording a coverage remaining duration between the mobile node and each of the neighboring mobile nodes. The communication module is configured for operatively receiving or transmitting a data packet, which is generated by a source node of the vehicular ad hoc network system. The processing unit is coupled to the positioning module, the speed detection module, the memory unit, and the communication module. The processing unit operatively generates a beacon message periodically based on the positioning signal and the speed information. The processing unit operatively controls the communication module to periodically broadcasting the beacon message.

The processing unit calculates and updates the coverage remaining duration between the mobile node and each of the neighboring mobile nodes recorded in the connection state table after received the beacon message being broadcasted by each of the neighboring mobile nodes. When the mobile node is a relay node, the processing unit operatively determines whether the coverage remaining duration between the mobile node and the subsequent mobile is less than a predefined threshold according to the connection table upon receiving the data packet from the communication module for determining whether to transform the relay node into a proxy node.

According to one exemplary embodiment of the present disclosure, wherein the relay node calculates the coverage remaining duration between the relay node and the subsequent mobile node based on a distance between the relay node and the subsequent mobile node and a relative moving speed therebetween.

According to one exemplary embodiment of the present disclosure, wherein the relay node calculates the coverage remaining duration between the relay node and the subsequent mobile node based on the transmission distance of the relay node, the distance between the relay node and the subsequent mobile node, and the speed of the relay node.

The present disclosure further provides a vehicular ad hoc network system including a plurality of mobile nodes. Each of the mobile nodes has an aforementioned communication apparatus installed therein. The mobile nodes include a source node, a destination mode, and a plurality of relay nodes. The source node establishes a network connection with the destination mode through the relay nodes and transmits a data packet to the destination node through the relay nodes. Any of the relay nodes can actively decide whether to transform into a proxy node according to a coverage remaining duration between the relay node and the subsequent mobile node.

According to one exemplary embodiment of the present disclosure, wherein, the processing unit of the communication apparatus operatively determining whether the coverage remaining duration between the relay node and the proxy node is less than a predefined threshold according to the connection state table after every predefined time interval. The processing unit operatively transforms the relay mode into the proxy node after determined that the coverage remaining duration between the relay node and the proxy node is less than a predefined threshold, establishes a sub-connection with the subsequent proxy node or the destination node, temporarily stores the data packet, forwards the data packet to the subsequent proxy node or the destination node.

The transmission control method which implements the split reliable transmission protocol can be programmed in the communication apparatus, such as a laptop, a GPS device, the processing unit of an event data recorder (EDR), through firmware design. Such that the network topology of the vehicular ad hoc network system can be dynamically and optimally configured to suit the network state of the vehicular ad hoc network system.

To sum up, exemplary embodiments of the present disclosure provide a transmission control method for a vehicular ad hoc network system, a communication apparatus of a mobile node, and a vehicular ad hoc network system. The transmission control method can actively determine whether to divide the network connection between the source node and the destination node into at least one sub-connection by employing proxy nodes according to the network state of the vehicular ad hoc network system (e.g., the mobility information of the mobile node) for adapting the instantaneous changing of the operational environment in the vehicular ad hoc network. Moreover, the data packet in the present disclosure can be temporarily stored in a memory space provided by the proxy nodes so that when the data packet is lost in any of the sub-connections, the data packet can be quickly retransmitted. In addition, the transmission control method can estimate the coverage remaining durations (CRD) between neighboring mobile nodes based on the position, the moving direction, and the speed of the mobile node and dynamically configure the transmission length in each sub-connection. Thereby, reduce the transmission failure rate of the point-to-point transmission as well as resolve the network congestion issue found in the prior technology.

In order to further understand the techniques, means and effects of the present invention, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present invention.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain the principles of the present invention.

DESCRIPTION OF THE EXEMPLARY EMBODIMENTS

Figure 1A:
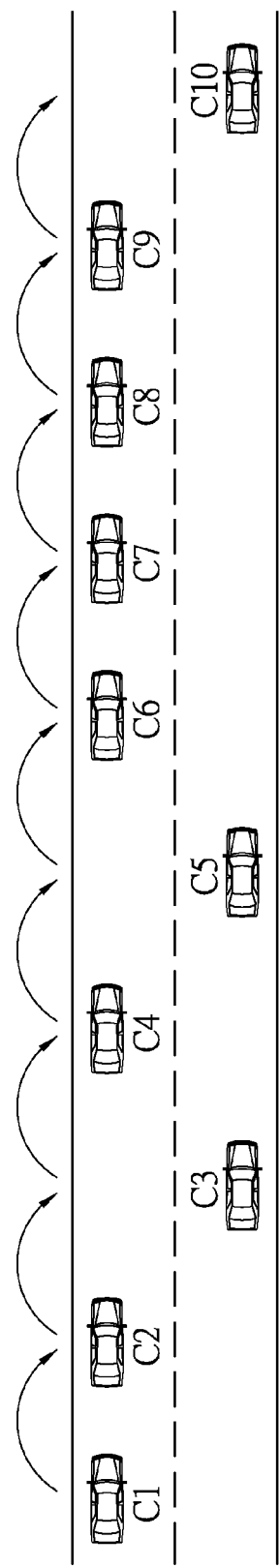
FIG. 1A is a diagram illustrating an operation of a VANET using the conventional TCP protocol.
Figure 1B:
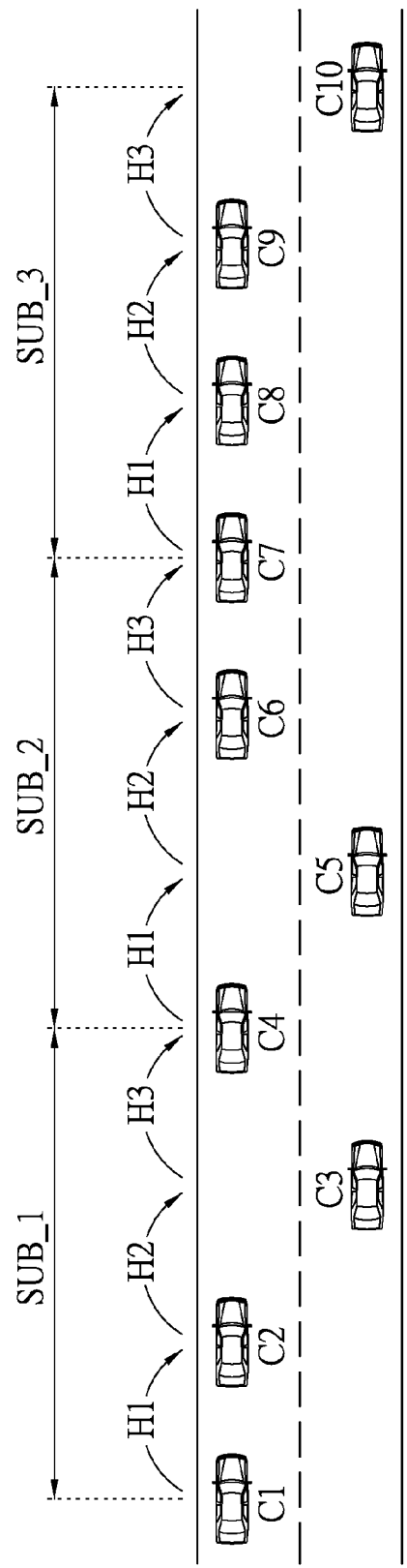
FIG. 1B is a diagram illustrating an operation of the VANET using the split-TCP protocol.

Reference will now be made in detail to the exemplary embodiments of the present disclosure, examples of which are illustrated in the accompanying drawings. Wherever possible, the same reference numbers are used in the drawings and the description to refer to the same or like parts.

The present disclose discloses a transmission control method, which implements a split reliable transmission control protocol for a vehicular ad hoc network (VANET) system and mobile nodes using the transmission control method. The transmission control method enables vehicles to perform reliable data transmission operations in sharing videos, driving information, driving safety information, or other driving-related information. In addition, the split reliable transmission control protocol of the VANET system can be used for constructing the traffic system including but not limited to the traffic management system, the traveler information system, the vehicle control and safety system, the emergency management system.

Because the exact implementations of a VANET system, the connection establishment and the packet transmission among mobile nodes as well as the operations of VANET system are known arts, thus for brevity, further descriptions are hereby omitted and only the portion related to the present disclosure will be described.

Figure 2A:
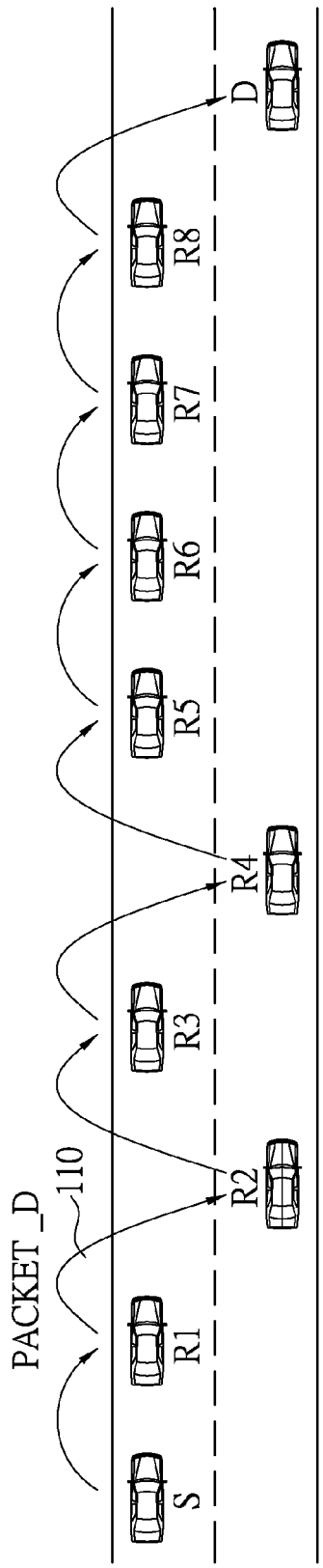
FIG. 2A is a diagram illustrating a VANET system provided in accordance to an exemplary embodiment of the present disclosure.

Please refer to FIG. 2A. FIG. 2A shows a diagram illustrating a VANET system provided in accordance to an exemplary embodiment of the present disclosure. The VANET system 1 includes a plurality of mobile nodes with communication capability. The mobile nodes include a source node S, a destination node D, and a plurality of relay nodes R1~R8. The source node S is linked to the destination node D through the relay nodes R1~R8 to form a VANET. Packets in the VANET are transmitted using the short-distance based multi-hop transmission mechanism Moreover, the network topology of the VANET system 1 changes rapidly due to high mobility of vehicles such as vehicles entering and leaving the VANET system 1.

In the present disclosure, the mobile nodes are refers to vehicles with communication capability, such as cars, buses, trucks, or the like. The VANET system 1 can provide the instant information exchange (including instant road conditions, notifying vehicles before arrival of emergency vehicle, or the like) among nearby vehicles i.e., vehicle-tovehicle (V2V) communication. Accordingly, the term vehicle and mobile node may be used interchangeably in the instant disclosure. The network topology of the VANET system 1 as described change rapidly along with the fast movement of the mobile node.

It is worth to note that in practice, the mobile node may refer to a vehicle or an infrastructure (e.g., the base station or road side unit) equipped with a communication apparatus to perform V2V communication or vehicle-to-infrastructure (V2I) communication.

A reliable network connection between the source node S and the destination node is first established. The source node S transmits a data packet PACKET_D to the destination node D through multiple transmission paths 110 formed from the relay nodes R1~R8. In the instant embodiment, mobile nodes are configured to wirelessly communicate with each other using the IEEE 802.11p, and the transmission distance of each mobile mode may range from 200 meters to 300 meters Specifically, the source node S forwards a data packet PACKET_D to the relay node R1 through the transmission path 110. Next, the relay node R1 forwards the data packet PACKET_D to the relay node R2 through the subsequent transmission path 110, and so on until the packet PACKET_D is forwarded to the destination node D. After the destination node D received the data packet PACKET_D, the destination node D transmits an acknowledgement packet associated with the data packet PACKET_D to the source node S through the same transmission paths (i.e. relay nodes R1~R8).

Under the structure of the VANET system 1, the mobile nodes periodically (e.g., a second) broadcast beacon messages MESS_BEACON (e.g., hello message), so that the mobility information associated with each mobile node (e.g., the position of the mobile node, the speed, and the moving direction) is broadcasted to each of the neighboring mobile nodes. The beacon message MESS_BEACON may include the identity information and the mobility information. The mobility information can further include the position data, the movement data, or the like.

For example, the source node S periodically broadcasts the beacon message MESS_BEACON to neighboring mobile nodes, i.e. the relay node R1. The relay node R1 periodically broadcasts the beacon message MESS_BEACON to each of the neighboring mobile nodes, i.e. the source node S, and the relay node R2. The relay node R2 periodically broadcasts the beacon message MESS_BEACON to each of the mobile nodes, i.e. the relay nodes R1 and R3 and so on.

Next, each mobile node can receive the beacon message MESS_BEACON broadcasted by each of the neighboring mobile nodes at any time. Each mobile node establishes or updates a connection state table, which is built-in in each respective mobile node according to the mobility information associated with neighboring mobile nodes upon receiving the beacon message. The connection state table is configured for recording the identity information and the mobility information (e.g., the position, the speed, and the moving direction of each neighboring mobile node) associated with each mobile node as well as the coverage remaining duration (CRD) between the mobile node itself and each of the neighboring mobile nodes.

For example, the relay node R1 updates the identity information, the position, the speed, and the moving direction associated with the source node S and the relay node R2 in the connection state table of the relay node R1 based on the beacon message broadcasted by the source node S and the relay node R2. The relay node R1 correspondingly calculates the coverage remaining duration CRD(R1, S) between the relay node R1 and the source node S, and the coverage remaining duration CRD(R1, R2) between the relay node R1 and the relay node R2. Similarly, the relay node R2 updates the identity information, the position, the speed, and the moving direction associated with the relay node R1 and R3 in the connection state table of the relay node R2. The relay node R2 correspondingly calculates the coverage remaining duration CRD(R2, R1) between the relay node R2 and the relay node R1 and the coverage remaining duration CRD(R2, R3) between the relay node R2 and the relay node R3. The relay node R3 updates the identity information, the position, the speed, and the moving direction associated with the relay node R2 and R4 in the connection state table of the relay node R3. The relay node R3 correspondingly calculates the coverage remaining duration CRD(R3, R2) between the relay node R3 and the relay node R2 and the coverage remaining duration CRD(R3, R4) between the relay node R3 and the relay node R4, and so on.

It is worth to note that in practice, each of mobile may receive the beacon message MESS_BEACON broadcasted by each of the neighboring mobile nodes at different time point as the distances between each mobile node and each of the neighboring mobile nodes may be different. For example, the relay node R2 and the source node S may receive the beacon message MESS_BEACON broadcasted by the relay node R1 at the same time, or one of the relay node R2 and the source node S may receive the relay node R1 earlier than the other because of the distance between the relay node R1 and one of the relay node R2 and the source node S is shorter. However, the instant embodiment is not limited thereto.

Figure 2B:
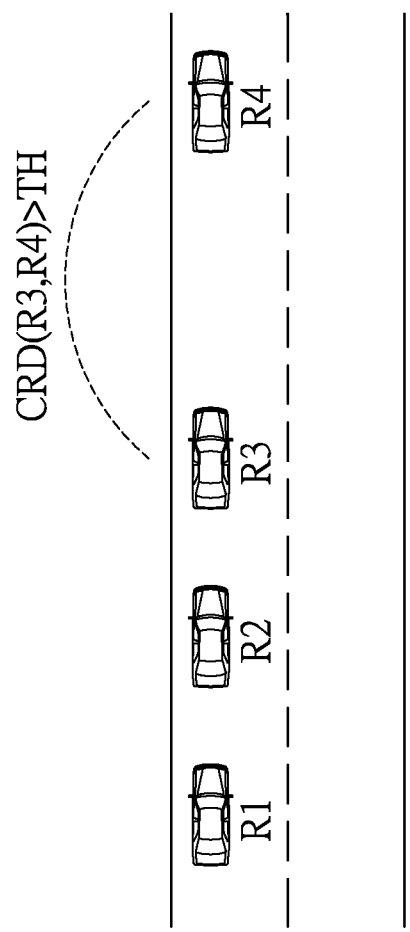
FIGS. 2B-2C are diagrams respectively illustrating the operation of the VANET system provided in accordance to the exemplary embodiment of the present disclosure.
Figure 2C:
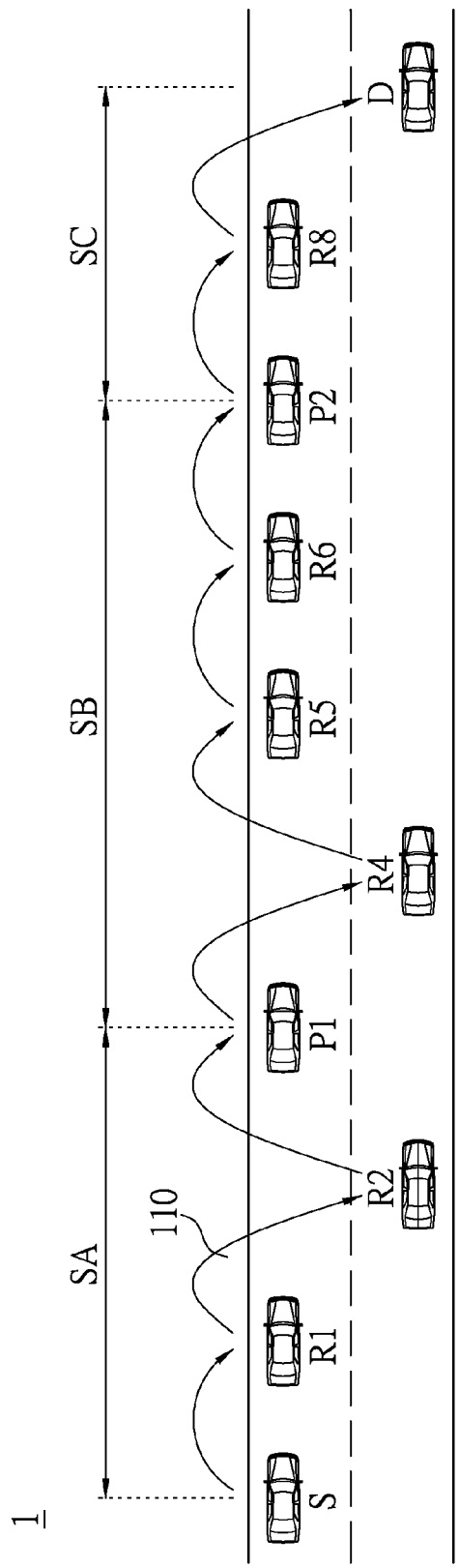

Next, please refer to FIG. 2B and FIG. 2C in conjunction with FIG. 2A. FIGS. 2B~2C respectively shows diagrams illustrating the operation of the VANET system provided in accordance to the exemplary embodiment of the present disclosure. As shown in FIG. 2B, when any of the relay nodes (e.g., the relay nodes R1~R8) receives the data packet PACKET_D, the relay node (e.g., the relay nodes R3) determines whether the coverage remaining duration (e.g., the coverage remaining duration CRD(R3, R4)) between the relay node (e.g., the relay node R3) and the subsequent mobile node (e.g., the relay node R4) is less than a predefined threshold TH (e.g., 1 second, 2 seconds, or 3 seconds) and determines whether to transform the relay node (e.g., the relay node R3) into a proxy node to divide the network connection between the source node S and the destination node D based on the location of the relay node (e.g., the relay node R3). It should be noted that the purpose of dividing the network connection is so that when the data packet is lost during packet transmission, the data packet can be quickly retransmitted by the preceding proxy node, thereby improves the stability of the sub-connection.

As described previously, because the mobile node may enter or leave the transmission range associated with each mobile node in the VANET system at any time, thus any of the relay nodes (e.g., the relay node R3) operatively checks on the coverage remaining duration (e.g., the coverage remaining duration CRD(R3, R4)) between the relay node (e.g., the relay node R3) and the subsequent mobile node (e.g., the relay node R4) according to the connection state table of the relay node (e.g., the relay node R3) upon receiving the data packet PACKET_D to verify whether the connection between the relay node (e.g., the relay node R3) and the subsequent mobile node (e.g., the relay node R4) is stable. The relay node (e.g., the relay node R3) instantly transforms into the proxy node P1 upon determined that the connection between the relay node (e.g., the relay node R3) and the subsequent mobile node (e.g., the relay node R4) is unstable.

Specifically, the relay node (e.g., the relay node R3) simultaneously notifies the preceding and the subsequent mobile node (e.g., the relay nodes R2 and R4) over transforming into the proxy node. The relay node (e.g., the relay node R3) then transforms to the proxy node P1 after confirming with the preceding and the subsequent mobile node (e.g., the relay nodes R2 and R4). The proxy node P1 subsequently stores the data packet PACKET_D searches, and establishes a sub-connection with the subsequent proxy node or the destination node. The network connection between the source node S and the destination node D is thus divided into two sub-connections by the proxy node P1 such that the data packet PACKET_D can be successfully transmitted to the destination node D.

As shown in FIG. 2C, during the transmission of the data packet PACKET_D, the relay node R3 transforms into the proxy node P1 as the relay node R3 determined that the coverage remaining duration CRD(R3, R4) is less than the predefined threshold TH. The relay node R7 transforms into the proxy node P2 as the relay node R7 determined that the coverage remaining duration CRD(R7, R8) is less than the predefined threshold TH.

When the relay node R3 has transformed into the proxy node P1, the relay node R3 temporarily stores the data packet PACKET_D. The proxy node P1 further simultaneously establishes a sub-connection SA with the source node S and a sub-connection SB with the subsequent proxy node P2. Similarly, after the relay node R7 has transformed into the proxy node P2, the proxy node P2 immediately stores the data packet PACKET_D received and establishes a sub-connection SC with the destination node D.

In the instant embodiment, the sub-connection SA is formed from the source node S, the relay node S2, and the proxy node P1. The sub-connection SB is formed from the proxy node P1, the relay nodes R4-R6, and the proxy node P2. The sub-connection SC is formed from the proxy node P2, the relay node R8, and the destination node D. In other words, the network connection between the source node S and the destination D is divided into three reliable sub-connections SA, SB, and SC to adapt to the changes in the network topology of the VANET system 1.

When the proxy node P1 verifies that the proxy node P2 has received the data packet PACKET_D (i.e. when the proxy node P1 receives the acknowledgement packet transmitted from the proxy node P2), the proxy node P1 removes the data packet PACKET_D stored therein. Similarly, when the proxy node P2 verifies that the destination node D has received the data packet PACKET_D (i.e. when the proxy node P2 receives the acknowledgement packet transmitted from the destination node D), the proxy node P2 removes the data packet PACKET_D stored therein.

When the data packet PACKET_D is lost in the sub-connection SA, such as when the source node S does not receive the acknowledgement packet, corresponding to the data packet, transmitted from the proxy node P1 within a period of time after transmitted the data packet PACKET_D, the source node S retransmits the data packet PACKET_D to the proxy node P1 until the source node S receives the acknowledgement packet transmitted from the proxy node P1. Similarly, when the data packet PACKET_D is lost in the sub-connection SB such as when the proxy node P1 does not receive the acknowledgement packet, corresponding to the data packet, transmitted from the proxy node P2 within a period of time after transmitted the data packet PACKET_D, the proxy node P1 retransmits the data packet PACKET_D to the proxy node P2 until the proxy node P1 receives the acknowledgement packet transmitted from the proxy node P2 and removes the data packet PACKET_D stored in the proxy node P. Moreover, when the data packet PACKET_D is lost in the sub-connection SC such as when the proxy node P2 does not receive the acknowledgement packet transmitted from the destination node D within a period of time), the proxy node P2 retransmits the data packet PACKET_D to the destination node D until the proxy node P2 receives the acknowledgement packet transmitted from the destination node D and removes the data packet PACKET_D stored in the proxy node P2.

It is worth to note that when any of the proxy nodes leaves the VANET system 1 causing the sub-connection between any of the proxy nodes and the subsequent proxy node or the destination node D to be interrupted, the proxy node operatively searches and establishes a new sub-connection between the proxy node and the subsequent proxy node or the destination node D.

Incidentally, any of the relay nodes R1~R8 can further actively determine whether the connection between the relay node and the subsequent mobile node is stable according to the connection state table thereof after every predefined time interval (e.g., every 5 seconds). That is, any of the relay nodes R1~R8 can determine whether the coverage remaining duration between the relay node itself and the subsequent mobile node is less than the predefined threshold TH after every predefined time interval for determining whether to transform the relay node into the proxy node. Any of the relay nodes R1~R8 may also determine whether the connection with the subsequent mobile node is stable according to the connection state table thereof upon receiving the connection request packet.

In another embodiment, any of the relay nodes R1~R8 may further determine whether the moving direction (or the traveling direction) thereof is different from the moving direction of the subsequent mobile node according to the connection state table thereof for determining whether to transform the relay node into the proxy node. That is, when any of the relay nodes R1~R8 determines that the moving direction thereof is different from the moving direction of the subsequent mobile (indicating the connection is unstable), the relay node instantly transforms into the proxy node.

In the instant embodiment, any of the proxy nodes may actively determines whether the connection with the subsequent mobile node is stable according to the connection state table thereof after every predefined time interval (e.g., every 5 seconds or 10 seconds) or after receiving the data packet PACKET_D, so as to determine whether to transform the proxy node into the relay node. Specifically, any of the proxy nodes can operatively determine whether the coverage remaining duration between the proxy node and the subsequent mobile node is greater than the predefined threshold TH and can determine whether the moving direction of the proxy node is the same as the moving direction of the subsequent mobile node for determining whether the connection between the proxy node and the subsequent mobile node is stable. When the coverage remaining duration between any of the proxy nodes and the subsequent mobile node is greater than the predefined threshold TH and the proxy node and the subsequent mobile node are moving in the same direction, the proxy node transforms into the relay node. In other words, when any of the proxy nodes determines either the coverage remaining duration between the proxy node and the subsequent mobile node is less than the predefined threshold TH or the proxy node and the subsequent mobile node are moving in different direction, the proxy node continue to operate as the proxy node.

However, since each of the proxy nodes needs to temporarily store the data packet PACKET_D and reestablishes the reliable transmission links, hence when the distance between the source node S and the destination node D is fixed, the more proxy nodes employed in a network connection (e.g., more sub-connections formed in the network), the slower the transmission speed for transmitting the data packet PACKET_D. On the contrary, the less number of the proxy nodes employed (e.g., the less number of sub-connections formed in the network), or even no proxy node (shown in FIG. 2A) is employed, the faster the transmission speed for transmitting the data packet PACKET_D. That is, if the network connection between the source node S and the destination node D is stable, (e.g., the moving direction and the relative speed between the nearby mobile nodes are the same), no proxy node is needed between the source node S and the destination node D.

It is well known that the network topology of the VANET system is rapidly changes due to the fast movement of the mobile nodes. Thus, the longer the network connection is between the source node and the destination, the higher the packet loss rate for the end-to-end transmission (e.g., the packet loss due to network congestion or unstable connection), and thereby increase the end-to-end delay. Therefore, by adaptively dividing the network connection between the source node and the destination node into sub-connections based on the changes in the network topology of the VANET system 1, the packet loss rate can be effectively lowered while the transmission speed and the transmission efficiency associated with the transmission of the data packet PACKET_D can be increased, thereby enhances the performance for the VANET system 1.

It is worth to note that the predefined threshold determines the number of the sub-connections formed between the source node S and the destination D in the VANET system 1. The larger the predefined threshold is, the greater number of the relay nodes is used in the VANET system 1. On the contrary, the smaller the predefined threshold is, the less number of the relay nodes is used in the VANET system 1. Moreover, the predefined threshold may be configured according to the actual operation of the VANET system 1 (e.g., the mobility condition associated with each of the mobile nodes), and the instant embodiment is not limited thereto. The broadcasting frequency of the beacon message may also be configured according to the actual operation of the VANET system 1 as well as the network state of the VANET system 1, and the instant embodiment is not limited thereto.

Figure 3:
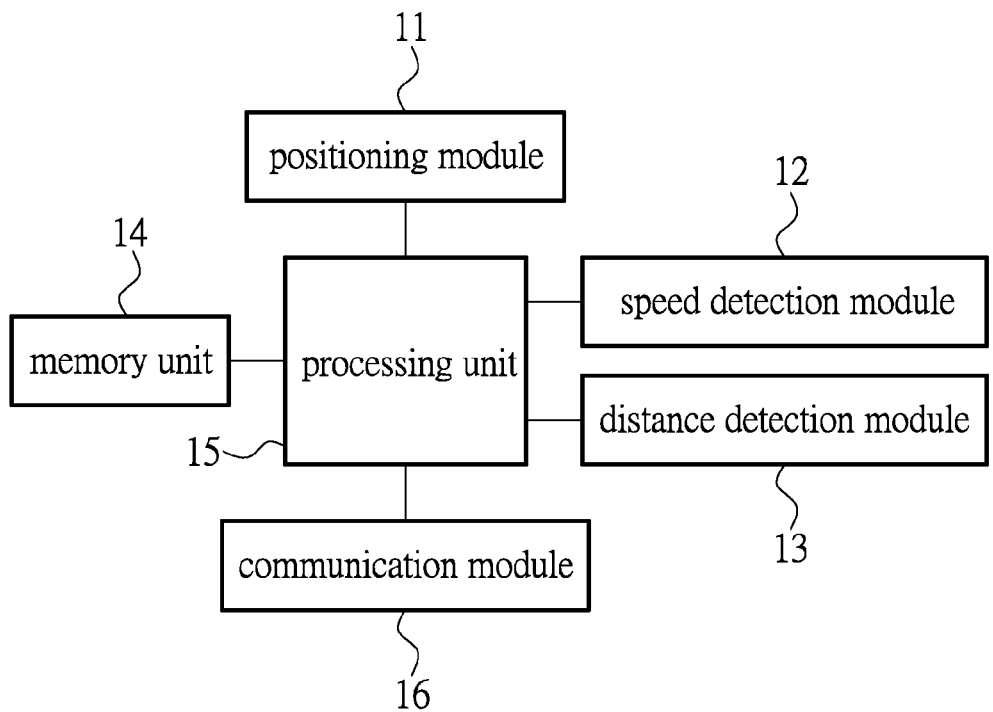
FIG. 3 is a block diagram of a communication apparatus for a mobile node provided in accordance to the exemplary embodiment of the present disclosure.

More specifically, please refer to FIG. 3 in conjunction with FIG. 2A. FIG. 3 shows a block diagram illustrating a communication apparatus installed in a mobile node provided in accordance to the exemplary embodiment of the present disclosure. Each of the mobile nodes is equipped with a communication apparatus 10, such as an on board communication unit or a GPS device of the vehicle. The communication apparatus 10 is configured for wirelessly communicating with the neighboring mobile nodes. In the instant embodiment, the mobile node refers to a vehicle. Since the vehicle has power generating capability, thus the necessary operating power for the communication apparatus 10 can be supplied by the vehicle.

The communication apparatus 10 includes a positioning module 11, a speed detection module 12, a distance detection module 13, a memory unit 14, a processing unit 15, and a communication module 16. The positioning module 11, the speed detection module 12, the distance detection module 13, the memory unit 14, and the communication module 16 are coupled to the processing unit 15, respectively.

The positioning module 11 is for operatively positioning the mobile node and generating a positioning signal corresponding to the location of the mobile node. The positioning signal may include the longitude and latitude coordinate data associated with the position of the mobile node. The positioning module 11 may be, for example, a global positioning system (GPS).

The speed detection module 12 is configured for operatively detecting the speed of the mobile node and generating a speed data correspondingly. The speed detection module 12 may be implemented by a speed sensor. The distance detection module 13 is configured for operatively detecting the distance between the mobile node and the subsequent mobile node.

The memory unit 14 is configured for storing the connection state table. The connection state table records the mobility information for each of the neighboring mobile nodes and the coverage remaining duration between each of the mobile nodes itself and each of the neighboring mobile nodes. Specifically, please refer to Table 1, which shows an embodiment of a connection state table provided in accordance to the exemplary embodiment of the present disclosure. The relay node R3 is taken as an example in Table 1.

TABLE 1

| identity | position | speed (m/s) | moving direction | distance (m) | CRD (s) |
|---|---|---|---|---|---|
| R2 | XX.XX N YY.YY E | 30 | NE | 30 | 20 |
| R4 | XX.XX N YY.YY E | 40 | NE | 42 | 10 |

When the mobile node is the source node, the proxy node, or the destination node, a temporary memory block (e.g., buffer) of the memory unit 14 is configured for storing the data packet PACKET_D. In the instant embodiment, the memory unit 14 may be a volatile or non-volatile memory, including but not limited to flash memory chip, read-only memory chip, or random access memory chip. In another embodiment, the memory unit 14 may also be a memory built-in in the processing unit 15. It shall be noted that the present disclosure does not limited the exact type, the exact structure, and the implementation associated with the memory unit 14.

The processing unit 15 is configured for controlling the operation of the positioning module 11, the speed detection module 12, the distance detection module 13, the memory unit 14, and the communication module 16 based on the operating mode of the mobile node (e.g. the mobile node being the source node, the relay node, the proxy node, or the destination node). The processing unit 15 operatively generates the beacon message MESS_BEACON periodically and broadcasts the position and the mobility information of the mobile node to each of the neighboring mobile nodes. The processing unit 15 further extracts the mobility information of each of the neighboring mobile nodes from the beacon message MESS_BEACON received, which is broadcasted by each of the neighboring mobile nodes. The processing unit 15 further calculates and updates the coverage remaining duration between the mobile node and each of the neighboring mobile nodes in the connection state table.

In one embodiment, the processing unit 15 may calculate the coverage remaining duration between the mobile node and each of the neighboring mobile nodes based on a relative moving speed between the mobile node and each of the neighboring mobile nodes and a distance therebetween. In another embodiment, the processing unit 15 may calculate the coverage remaining duration between the mobile node and each of the neighboring mobile nodes based on the relative speed of the mobile node and a relative distance between the mobile node and each of the neighboring mobile nodes.

When the mobile node is the relay node, the processing unit 15 operatively determines whether to transform the mobile node into the proxy node based on the coverage remaining duration between the mobile and the subsequent mobile node (i.e. determining whether the coverage remaining duration is less than the predefined threshold TH). When the mobile node is the proxy node, the processing unit 15 operatively determines whether to transform the proxy node into the relay node based on the coverage remaining duration between the mobile node and the subsequent mobile (i.e. determining whether the coverage remaining duration is greater than the predefined threshold) and the moving directions of the mobile node and the subsequent mobile using the connection state table.

The communication module 16 operatively receives or transmits a packet (e.g., the data packet PACKET_D, the notification packet, the connection request packet, the acknowledgement packet, and the like), and the beacon message MESS_BEACON. In the instant embodiment, the communication module 16 is configured to wirelessly communicate with the communication apparatus 10 of other mobile node using the IEEE 802.11p standard. The IEEE 802.11p standard is adapted to the dedicated short range communications (DSRC). The IEEE 802.11p operates in the licensed ITS band the 5.9 GHz (e.g., 5.85 GHz-5.925 GHz.). In practice, the communication module 16 may be also configured to use other wireless communication technology such as WiFi, IEEE 1609(WAVE), IEEE 802.16(WiMAX), or the like for wirelessly communicating with the communication apparatus 10 of other mobile node. However, the instant embodiment is not limited thereto.

Figure 4A:
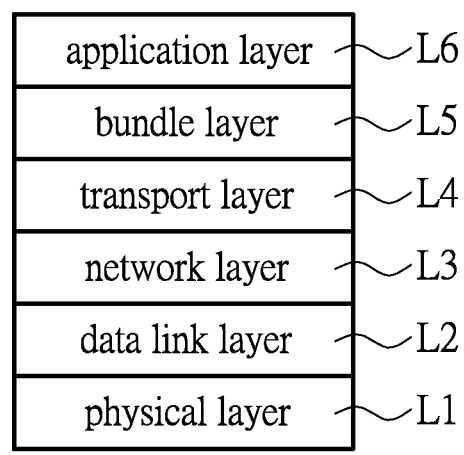
FIG. 4A is a diagram illustrating of the architecture of a protocol stack provided in accordance to the exemplary embodiment of the present disclosure.

For further understanding, the following description is provided for describing the detail architecture of a protocol stack used for the mobile node corresponding to the split reliable transmission control protocol disclosed in the present disclosure. Please refer to FIG. 4A in conjunction with FIG. 3. FIG. 4A shows a diagram illustrating the architecture of a protocol stack provided in accordance to the exemplary embodiment of the present disclosure. The protocol stack 150 may be defined and configured by the processing unit 15 of the communication apparatus 10. The protocol stack 150 includes six layers and the stack order of the six layers is as follow: a physical layer L1, a data link layer L2, a network layer L3, a transport layer L4, a bundle layer L5, and an application layer L6.

The data link layer L2 and the physical layer L1 are defined based on the IEEE 802.11p standard. The data link layer L2 operatively generates the packet based on the IEEE 802.11p standard and wirelessly transmits the packet to other mobile node or receives the packet from other mobile node through the physical layer L1.

The network layer L3 is configured for operatively determining when to check whether the network connection is stable, and whether to transform the relay node (e.g., the relay nodes R1~R8 shown in FIG. 2A) into the proxy node, or whether to transform the proxy node (e.g., the proxy nodes P1, P2) into the relay node according to the connection state table for deciding the transmission method for transmitting the packet to other mobile node or the packet processing method for the packet received. The network layer L3 operative to periodically generate the beacon message MESS_BEACON (e.g., the hello message) containing the mobility information corresponding to the mobile node and broadcast the beacon message MESS_BEACON to each of the neighboring mobile nodes using the data link layer L2 and the physical layer L1. The network layer L3 can be further configured to receive the beacon message MESS_BEACON broadcasted by each of the neighboring mobile nodes and calculates the coverage remaining duration between the mobile node itself and each of the mobile nodes. The network layer L3 correspondingly updates the connection state table store in the memory unit 14 of the communication apparatus 10.

The network layer L3 can operatively select and determine the transmission path (e.g., the transmission path 110 shown in FIG. 2C) for transmitting the packet to the subsequent mobile node according to the network congestion condition, the quality of service, the throughput, the priority of the packet transmission, and the like associated with the VANET system 1.

The transport layer L4 is defined and configured by the processing unit 15 based on the wave short message protocol (WSMP). The transport layer L4 is configured for searching and establishing the connection with the source node S, the proxy node, or the destination node D. The transport layer L4, may for example, transmit the connection request packet to the subsequent proxy node or the destination node through the network layer L3, the data link layer L2, the physical layer L1 and establishes the connection with the subsequent proxy node or the destination node after received the connection confirmation packet transmitted by the subsequent proxy node or the destination node.

Next, the transport layer L4 can be configured to temporarily store the packet until the transport layer L4 verifies that the packet has successfully transmitting and removes the packet. When the transport layer L4 has fail to transmits the packet (e.g., the packet is lost), the transport layer L4 retransmits the packet. For example, the transport layer L4 operatively retransmits the packet through the network layer L3, the data link layer L2, and the physical layer L1 after a predefined time interval. The bundle layer L5 is configured for operatively providing reliable end-to-end transmission. The application layer L6 is configured for communicating with an application program executed by the processing unit of the communication apparatus 10. In the instant disclosure, the communication module 16 may be implemented by a transceiver chip.

Incidentally, channel congestion may occur when the network connection formed between the source node S and the destination node D shares the same channel with another connection in packet transmission, which may increase packet loss rate. Thus, the transport layer L4 can be also configured to control and regulate the data flow using end to end congestion control technique to avoid network congestion. For example, the transport layer L4 can operatively control the rate of data flow in the transmission using the data flow control method for the conventional TCP protocol, i.e., by adjusting the size of the congestion window, to avoid network congestion. It shall be noted that the handling method for network congestion, the method for establishing and selecting transmission path, as well as the packet transmission technique are well known arts and are not the emphasis of the present disclosure, thus further description are herein omitted.

The processing unit 15 may be implemented by a processing chip such as a central processing unit (CPU), a microcontroller, an embedded controller, that is disposed in the communication apparatus 10 and is programmed to define the protocol stack 150 through firmware. However the instant embodiment is not limited thereto.

Figure 4B:
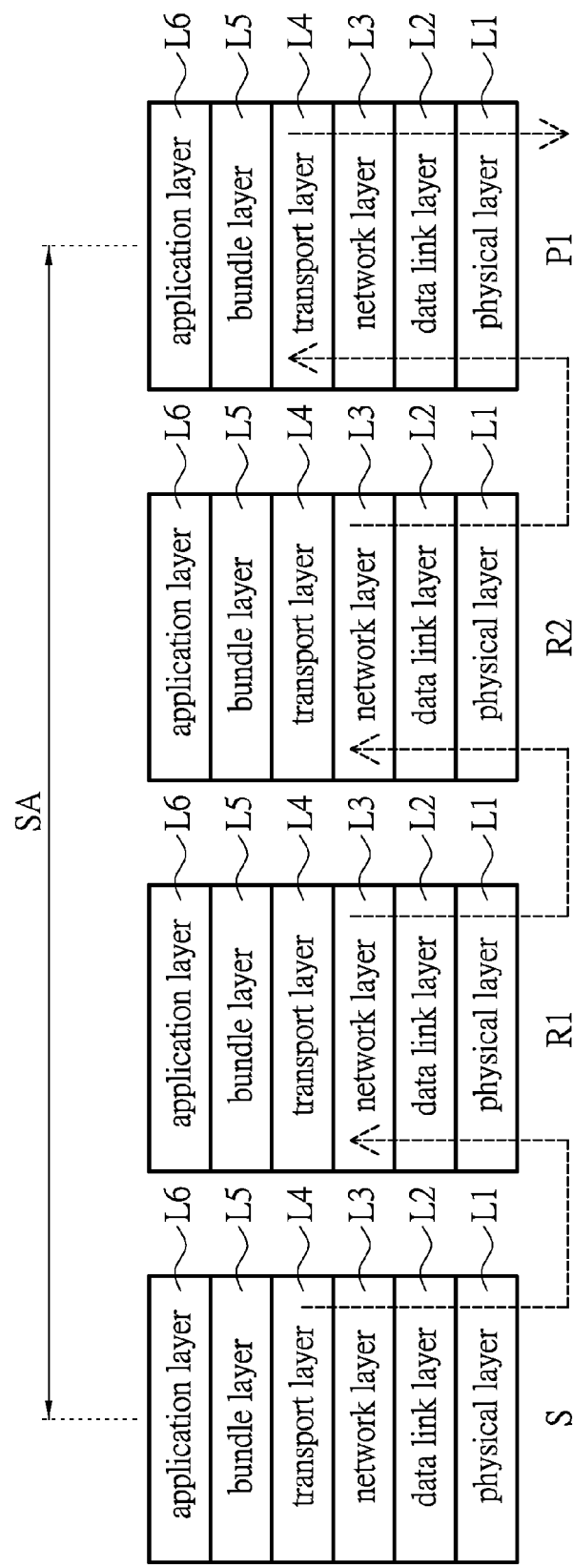
FIG. 4B is a diagram illustrating operations of the protocol stacks associated with each mobile node in the sub-connection of the VANET system provided in accordance to the exemplary embodiment of the present disclosure.

Next, for better understand over the operation of the VANET system 1, the operation of the VANET system 1 is described in further details in terms of the operation of the protocol stack 150. Please refer to FIG. 4B in conjunction with FIG. 2C and FIG. 3. FIG. 4B shows a diagram illustrating operations of the protocol stacks associated with each mobile node in a sub-connection of the VANET system provided in accordance to the exemplary embodiment of the present disclosure. Specifically, FIG. 4B illustrates operations of the protocol stacks associated with each mobile node in the sub-connection SA of the VANET system shown in FIG. 2C.

In the instant embodiment, when the mobile node is the relay node, the processing unit 15 of the communication apparatus 10 passes the data packet PACKET_D received from the physical layer L1 to the network layer L3 for further process. The network layer L3 operatively determines whether to pass the data packet PACKET_D to the transport layer L4 or to directly transmit the data packet PACKET_D wirelessly to the subsequent mobile node through the data link layer L2 and the physical layer L1 upon determined whether to transform the relay node into the proxy node. When the network layer L3 of the relay node determines that the connection is stable and no need to transform into the proxy, the network layer L3 of the relay node wirelessly forwards the data packet PACKET_D received to the subsequent mobile node through the data link layer L2 and the physical layer L1.

As shown in FIG. 4B, the transport layer L4 of the source node S operatively establishes the reliable sub-connection SA with the transport layer L4 of the proxy node P1 and forwards the data packet PACKET_D thereto. Briefly, during the executing of the application program, the application layer L6 of the source node S generates the data packet PACKET_D to be transmitted in response to a data transmission request. The transport layer L4 further inserts the address of the mobile node (e.g., the proxy node P1), which the data packet PACKET_D is to be transmitted, into the data packet PACKET_D. After the network layer L3 of the source node S has selected the transmission path for the data packet PACKET_D, the data packet PACKET_D is then passed to the data link layer L2 and the physical layer L1 for transmitting to the relay node R1.

After the physical layer L1 of the relay node R1 has received the data packet PACKET_D, the physical layer L1 passes the data packet PACKET_D to the network layer L3 through the data link layer L2 to further process the data packet PACKET_D. When the network layer L3 of the relay node R1 receives the data packet PACKET_D, the network layer L3 determines whether the coverage remaining duration CRD(R1, R2) between the relay node R1 and the relay node R2 is less than the predefined threshold TH (e.g., 3 seconds) according to the connection state table stored in the memory unit 14. When the network layer L3 of the relay node R1 determines that the coverage remaining duration CRD(R1, R2) between the relay node R1 and the relay node R2 is greater than the predefined threshold TH (e.g., 20 seconds), the network layer L3 operatively selects the transmission path between the relay node R1 and the relay node R2 and passes the data packet PACKET_D the data link layer L2, the physical layer L1 and forwards the data packet PACKET_D to the relay node R2 through the transmission path selected.

Similarly, the physical layer L1 of the relay node R2 passes the data packet PACKET_D to the network layer L3 only for processing the data packet PACKET_D upon receiving the data packet PACKET_D. When the network layer L3 of the relay node R2 determines that the coverage remaining duration CRD(R2, R3) between the relay node R2 and the relay node R3 is greater than the predefined threshold TH (e.g., 30 seconds), the network layer L3 passes the data packet PACKET_D to the data link layer L2 and the physical layer L1 for transmitting the data packet PACKET_D to the relay node R3.

The network layer L3 of the proxy node P1 operatively passes the data packet PACKET_D to the transport layer L4 upon receiving the data packet PACKET_D for processing the data packet PACKET_D. The transport layer L4 of the proxy node P1 operatively temporarily stores the data packet PACKET_D in the temporary memory block of the memory unit 14. The transport layer L4 of the proxy node P1 further operatively establishes the reliable sub-connection with the subsequent proxy node (e.g., the proxy node P2). The data packet PACKET_D is then passed to the data link layer L2 and the physical layer L1 for transmitting the data packet PACKET_D to the subsequent mobile node (e.g., the relay node R4) after the network layer L3 of the proxy node P1 has determined the transmission path, of which the data packet PACKET_D is to be routed through.

In the instant embodiment, the network layer L3 of the mobile node not only is used for determining the transmission path, but also used for determining to configure the mobile node as the relay node or the proxy node based on the coverage remaining duration between the mobile node itself and the subsequent mobile node. When the mobile is the relay node, the data packet PACKET_D is passed to the network layer L3 for processing after the data packet PACKET_D is received at the physical layer L1 of the mobile node. The network layer L3 operatively determines whether to pass on the data packet PACKET_D to the transport layer L4 for further processing, or to directly passes the data packet PACKET_D to the data link layer L2 and the physical layer L1 for wirelessly transmitting the data packet_D to the subsequent mobile node, after the network layer L3 has determined whether to transform into the proxy node.

When the mobile node is the proxy node (e.g., the proxy node P1), the data packet PACKET_D received is passed on to the transport layer L4 from the physical layer L1 of the mobile node for temporarily storage while the sub-connection between the mobile node and the subsequent proxy node (e.g., the proxy node P2) or the destination node D is searched and established. When the transport layer L4 successfully transmits the data packet PACKET_D to the corresponding proxy node P2 or the destination node D, the transport layer L4 removes the data packet PACKET_D.

When the data packet PACKET_D is lost in during transmission (i.e. when the transport layer L4 does not receive the acknowledgement packet for the data packet PACKET_D, transmitted from the subsequent proxy node (e.g., the proxy node P2) or the destination node D), the transport layer L4 retransmits the data packet PACKET_D to the subsequent proxy node or the destination node D until the transport layer L4 receives the acknowledgement packet for the data packet PACKET_D from the subsequent proxy node (e.g., the proxy node P2) or the destination node D and establishes the reliable sub-connection between the proxy node and the subsequent proxy node (e.g., the proxy node P2) or the destination node D.

In one embodiment, the network layer L3 of the proxy node may further determine whether the coverage remaining duration between the proxy node and the subsequent mobile node is greater than the predefined threshold TH and whether the proxy node is moving in the same direction as the subsequent mobile node based on the connection state table upon receiving the data packet PACKET_D or after every predefined time interval (e.g., every 5 seconds). When the network layer L3 determines that the coverage remaining duration between the proxy node itself and the subsequent mobile node is greater than the predefined threshold TH and the moving directions of the proxy node and the subsequent mobile node are the same, the proxy node transforms into the relay node and directly passes the data packet PACKET_D to the data link layer L2 and the physical layer L1 to transmit the data packet PACKET_D to the subsequent mobile node.

Accordingly, the relay node of the VANET system 1 can actively determine whether to divide the network connection between the source node and the destination node of a VANET system 1 into at least a sub-connection based on the change in the network topology (such as the speed and the moving direction of the vehicle) of the VANET system 1 to instantly adaptive to the network states of the VANET system 1 and increase the reliability of the packet transmission.

From the aforementioned exemplary embodiments, the present disclosure may generalize a transmission control method, which can be adapted for the VANET system 1. The transmission control method can actively determine whether to divide the network connection between the source node and the destination node of a VANET system into at least a sub-connection and the length therewith based on the change in the network topology of the VANET system, therefore is adaptive to the instant network changes of the VANET system. Accordingly, not only the packet transmission speed can be greatly enhanced, the operational stability of the VANET system can also be improved.

Figures 1, 5:
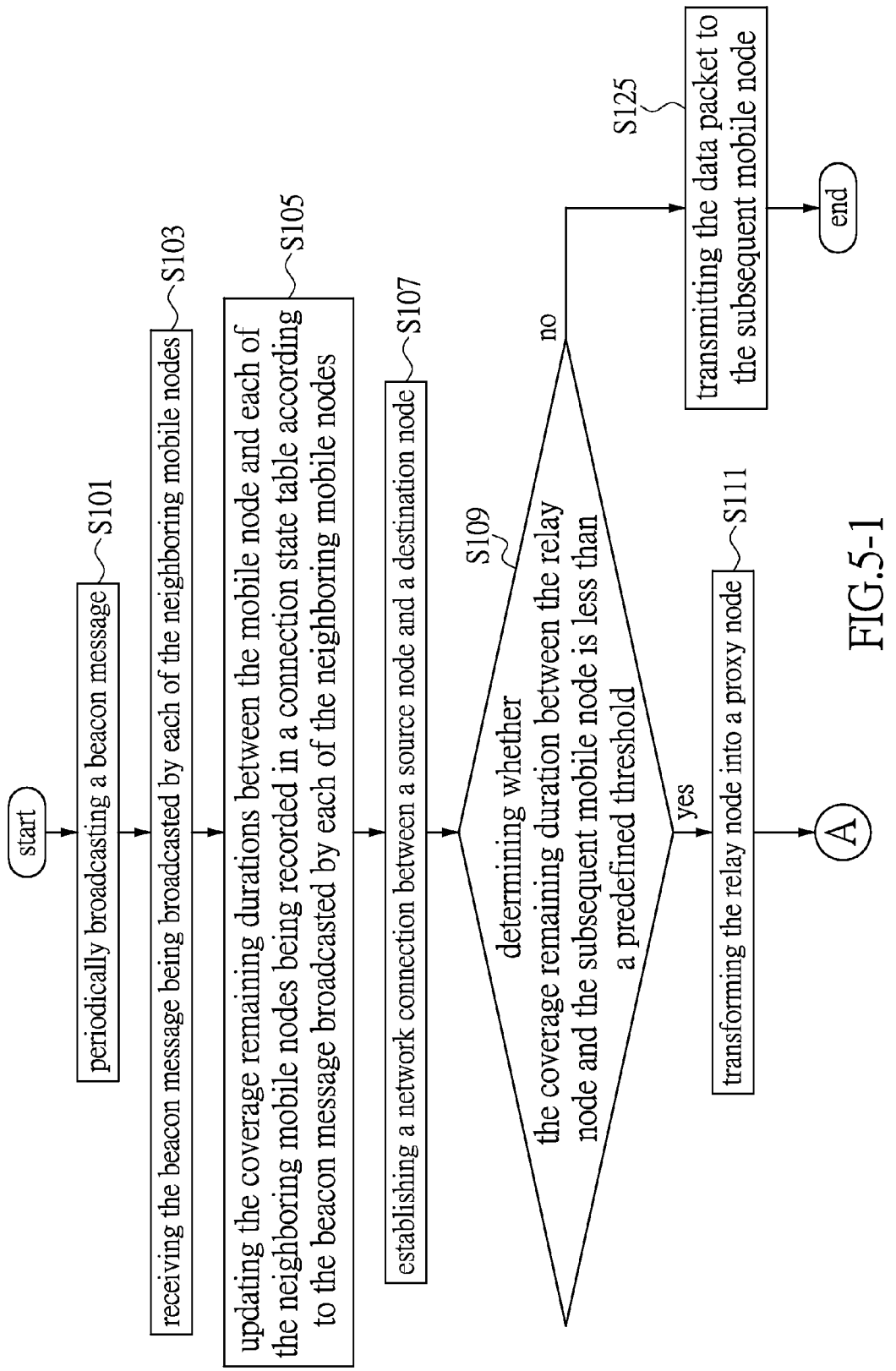
FIG. 5-1 and FIG. 5-2 are flowcharts respectively illustrating a transmission control method provided in accordance to the exemplary embodiment of the present disclosure.
Figures 2, 5:
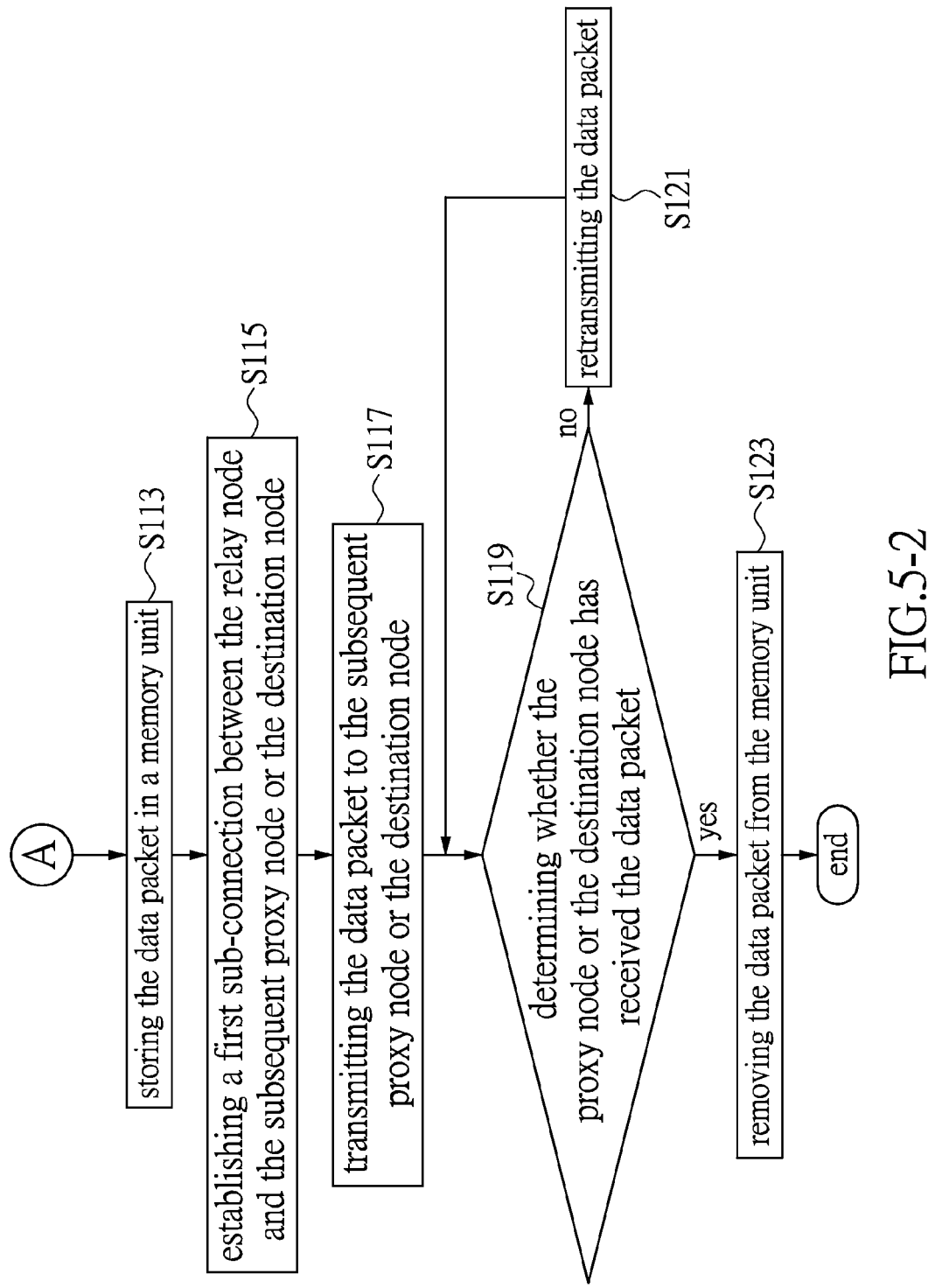

Please refer to FIG. 5-1 and FIG. 5-2 in conjunction to FIG. 2A-2C. FIG. 5-1 and FIG. 5-2 are flowcharts respectively illustrating a transmission control method provided in accordance to an exemplary embodiment of the present disclosure.

In Step S101, each of the mobile nodes periodically broadcasts the beacon message MESS_BEACON (e.g., hello message) to broadcast the mobility information associated with each mobile node to each of the neighboring mobile nodes. The beacon message MESS_BEACON may include the identity information, the position of the mobile node, the speed of the mobile node, and the corresponding moving direction of the mobile node. Each of the neighboring mobile nodes may be at different distance from the mobile node broadcasting beacon message MESS_BEACON, therefore may receive the beacon message at different times.

For example, the relay node R1 periodically broadcasts the beacon message MESS_BEACON for broadcasting the associated identity information, the position data, the speed and the moving direction to the neighboring mobile nodes i.e., the source node S and the relay node R2. In which, the source node S and the relay node R2 may receive the beacon message MESS_BEACON at the same time or at different time.

In Step S103, each of the mobile nodes receives the beacon message being broadcasted by each of the mobile nodes. In Step S105, each of the mobile nodes extract the mobility information associated with each of the neighboring nodes from the beacon message MESS_BEACON received to update the coverage remaining between the mobile node and each of the neighboring nodes duration in the connection state table stored in each of the mobile node (as listed in the table 1).

In Step S107, the network connection between the source node S and the destination node D is established. Particularly, the source node S may transmit the connection request packet to the destination node D. The reliable network connection between the source node S and the destination D is established after the source node S received the corresponding connection from the destination node D.

In Step S109, when any of the relay nodes (e.g., the relay node R3) in the network connection receives the data packet PACKET_D, the relay node determines whether the coverage remaining duration (e.g., the coverage remaining duration CRD(R3, R4)) between the relay node itself (e.g., the relay node R3) and the subsequent mobile node is less than a predefined threshold TH (e.g., 3 seconds) based on the connection state table.

When the relay node (e.g., the relay node R3) determines that the coverage remaining duration (e.g., the coverage remaining duration CRD(R3, R4)) between the relay node itself (e.g., the relay node R3) and the subsequent mobile node is less than a predefined threshold TH according to the connection state table, executes Step S111. Conversely, when the relay node (e.g., the relay node R3) determines that the coverage remaining duration (e.g., the coverage remaining duration CRD(R3, R4)) between the relay node (e.g., the relay node R3) itself and the subsequent mobile node is greater than a predefined threshold TH according to the connection state table, executes Step S125.

In Step S111, the relay node (e.g., the relay node R3) transforms into a proxy node (e.g., the proxy node P1).

Specifically, the relay node (e.g., the relay node R3) may simultaneously transmit a notification packet to the preceding mobile node (e.g., the relay node R2) and the subsequent mobile node (e.g., the relay node R4), respectively. The relay node (e.g., the relay node R3) subsequently transforms into the proxy node (e.g., the proxy node P1) after received the confirmation packet corresponding to the notification packet. The confirmation packet is transmitted from the preceding mobile node (e.g., the relay node R2) and the subsequent mobile node (e.g., the relay node R4).

Afterward, the proxy node (e.g., the proxy node P1) temporarily stores the data packet PACKET_D in the temporary memory block of the memory unit of the proxy node (e.g., the proxy node P1). The proxy node establishes the first sub-connection (e.g., sub-connection SB) with the subsequent proxy node (e.g., the proxy node P2) or the destination node D (Step S113 and Step S115).

The proxy node (e.g., the proxy node P1) at the same time establishes a second sub-connection (e.g., the sub-connection SA) with the preceding proxy node or the source node S.

In Step S117, the proxy node (e.g., the proxy node P1) transmits the data packet PACKET_D to the subsequent proxy node (e.g., the proxy node P2) or the destination node D through the first sub-connection (e.g., the sub-connection SB) using the multi-hop scheme.

In Step S119, the proxy node (e.g., the proxy node P1) determines whether the subsequent proxy node (e.g., the proxy node P2) or the destination node D has received the data packet PACKET_D.

Specifically, when the proxy node (e.g., the proxy node P1) does not receive the acknowledgement packet, corresponding to the data packet PACKET_D, transmitted by the subsequent proxy node (e.g., the proxy node P2) or the destination node D after transmitted the data packet PACKET_D within a predefined time interval (e.g., 2 seconds), the proxy node (e.g., the proxy node P1) determines that the subsequent proxy node (e.g., the proxy node P2) or the destination node D did not receive the data packet PACKET_D (i.e. the data packet PACKET_D is lost) and executes Step S121.

When the proxy node (e.g., the proxy node P1) receives the acknowledgement packet corresponding to the data packet PACKET_D after transmitted the data packet PACKET_D within a predefined time interval (e.g., 2 seconds), the proxy node (e.g., the proxy node P1) determines that the subsequent proxy node (e.g., the proxy node P2) or the destination node D has received the data packet PACKET_D and executes Step S123.

In Step S121, the proxy node (e.g., the proxy node P1) retransmits the data packet PACKET_D to the subsequent proxy node (e.g., the proxy node P2) or the destination node D, and returns to Step S119 to re-determine whether the subsequent proxy node (e.g., the proxy node P2) or the destination node D has received the data packet PACKET_D.

In Step S123, the proxy node (e.g., the proxy node P1) removes (delete) the data packet PACKET_D stored in the temporary memory block of the memory unit. In Step S125, the relay node (e.g., the relay node R3) forwards the data packet PACKET_D to the subsequent mobile node (e.g., the relay node R4).

As described previously, the coverage remaining duration between the mobile and each of the neighboring mobile nodes recorded in the connection state table of each of the mobile nodes can be calculated according to the relative speed and the distance between the mobile node and each of the neighboring mobile nodes, or according to the speed of the mobile node and the relative distance between the mobile node and each of the neighboring mobile nodes.

Computations for the coverage remaining duration between each mobile node and each of the neighboring mobile nodes record in the connection state table are provided in the following paragraphs. Please refer to FIG. 6, FIG. 6 shows a diagram illustrating a transmission range associated with a mobile node provided in accordance to the exemplary embodiment of the present disclosure.

Figure 6:
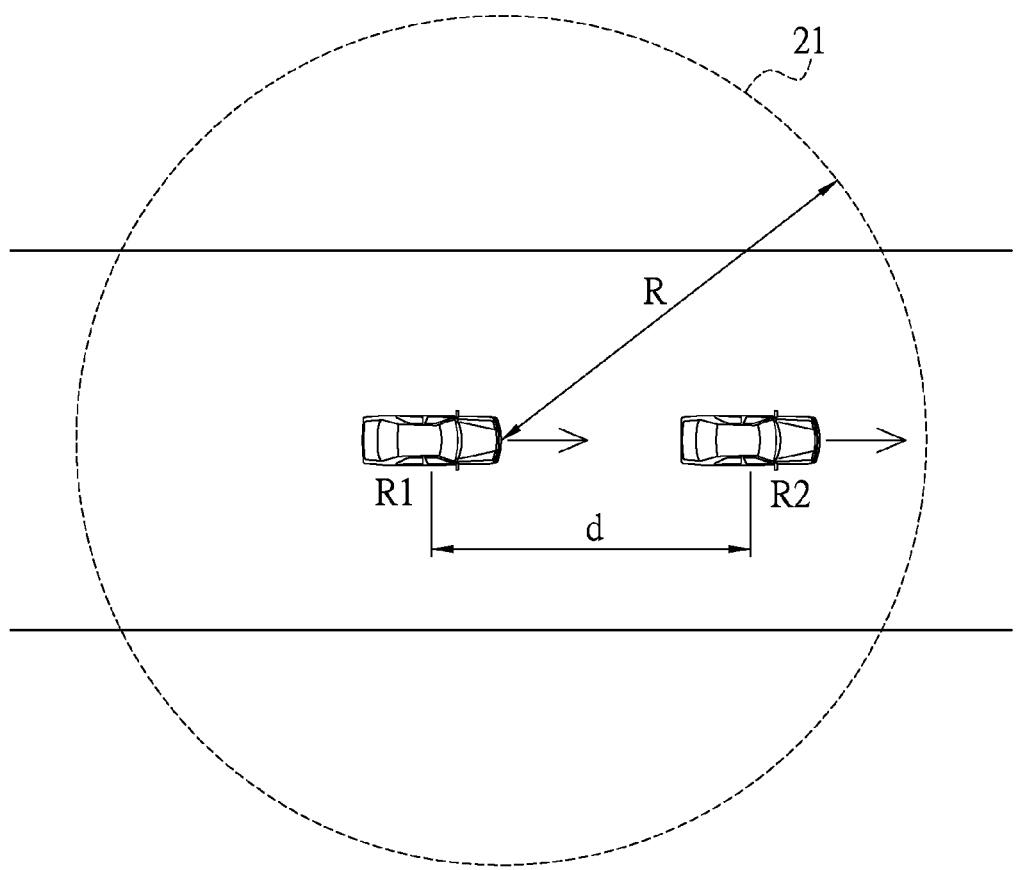
FIG. 6 is a diagram of a transmission range associated with a mobile node provided in accordance to the exemplary embodiment of the present disclosure.

As shown in FIG. 6, the relay node R1 has a transmission range 21, which is defined by a transmission distance R (e.g., 200 meters to 300 meters). The relay node R2 (i.e., the subsequent mobile node neighboring to the relay node R1) is within the transmission range 21 of the relay node R1. There is a distance d between the relay node R1 and the relay node R2. The relay node R1 and the relay node R2 are moving in the same direction. The coverage remaining duration between the relay node R1 and the relay node R2 can be calculated according to the connectable distance between the relay node R1 and the relay node R2. That is, the coverage remaining duration between the relay node R1 and the relay node R2 can be calculated according to the transmission distance R of the relay node R1, the distance d between the relay node R1 and the relay node R2, and the relative speed therebetween.

When the relay node R1 determines that the speed of the relay node R1 is less than the speed of the relay node R2 according to the connection state table, the relay node R1 can calculate the coverage remaining duration CRD(R1, R2) between the relay node R1 and the relay node R2 using equation (1), $$CRD(R1, R2) = \frac{R - |\overline{P_1} - \overline{P_2}|}{|\overline{V_1} - \overline{V_2}|} \quad (1)$$

wherein CRD(R1, R2) represents the coverage remaining duration between the relay node R1 and the relay node R2; R herein represents the transmission distance of the relay node R1; $\overline{P_1}$ represents the position vector of the relay node R1; $\overline{P_2}$ represents the position vector of the relay node R2; $\overline{V_1}$ represents the velocity vector of the relay node R1; $\overline{V_2}$ represents the velocity vector of the relay node R2.

In other words, when the speed of the relay node R1 is less than the speed of the relay node R2, the coverage remaining duration between the relay node R1 and the relay node R2 is equal to the time interval before the relay node R2 moves out of the transmission range 21 of the relay node R1.

When the relay node R1 determines that the speed of the relay node R1 is greater than the speed of the relay node R2 according to the connection state table, the relay node R1 calculate the coverage remaining duration CRD(R1, R2) between the relay node R1 and the relay node R2 using equation (2), $$CRD(R1, R2) = \frac{R + |\overline{P_1} - \overline{P_2}|}{|\overline{V_1} - \overline{V_2}|} \quad (2)$$

wherein CRD(R1, R2) represents the coverage remaining duration between the relay node R1 and the relay node R2; R represents the transmission distance of the relay node R1; $\overline{P_1}$ represents the position vector of the relay node R1; $\overline{P_2}$ represents the position vector of the relay node R2; $\overline{V_1}$ represents the velocity vector of the relay node R1; $\overline{V_2}$ represents the velocity vector of the relay node R2.

Figure 7A:
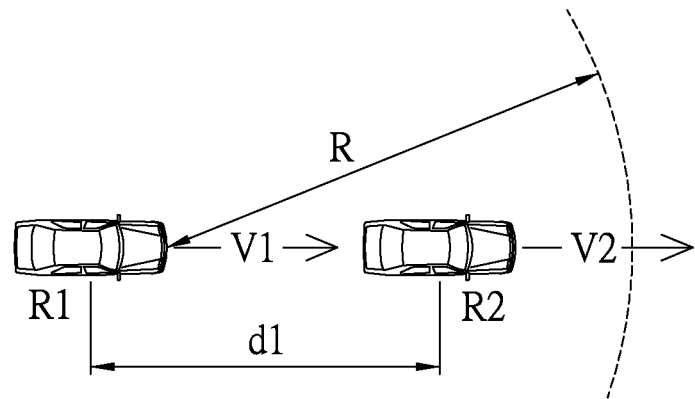
FIGS. 7A-7B are diagrams respectively illustrating movements of mobile nodes provided in accordance to the exemplary embodiment of the present disclosure.
Figure 7B:
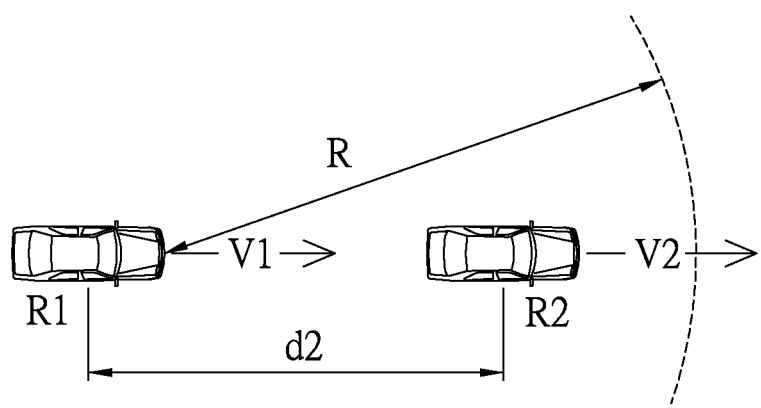

For example, please refer to FIG. 7A and FIG. 7B. FIGS. 7A-7B show diagrams respectively illustrating the movements of mobile nodes provided in accordance to the exemplary embodiment of the present disclosure.

As shown in FIG. 7A, the speed of the relay node R1 is V1 while the speed of the relay node R2 is V2. In which, the speed V2 of the relay node R2 is greater than the speed (V1) of the relay node R1. There is a distance d1 between the relay node R1 and the relay node R2. The relay node R1 and the relay node R2 are moving in the same direction. The coverage remaining duration CRD(R1, R2) between the relay node R1 and the relay node R2 thus can be calculated by equation (1).

Supposing the transmission distance R of the relay node R1 is 250 meters, and the distance d1 between the relay node R1 and the relay node R2 is 100 meters. The speed of the relay node R1 is 25 meters per second and the speed of the relay node R2 is 30 meters per second. Accordingly, the coverage remaining duration between the relay node R1 and the relay node R2 is calculated to be 30 seconds.

When the predefined threshold is set to be 3 seconds, the relay node R1 can therefore determine that the connection state between the relay node R1 and the relay node R2 is stable as the coverage remaining duration between the relay node R1 and the relay node R2 is greater than the predefined threshold. Hence, there is no need for the relay node R1 to transform itself into the proxy node.

Please refer to FIG. 7B, the speed V2 of the relay node R2 is now greater than the speed V1 of the relay node R1. There is a distance d2 between the relay node R1 and the relay node R2. The relay node R1 is moving in the same direction as the relay node R2. The coverage remaining duration CRD(R1, R2) between the relay node R1 and the relay node R2 thus can be calculated using equation (2).

Supposing the transmission distance R of the relay node R1 is 250 meters, and the distance d2 between the relay node R1 and the relay node R2 is 100 meters. Moreover, the speed of the relay node R1 is 30 meters per second and the speed of the relay node R2 is 25 meters per second. Accordingly, the coverage remaining duration between the relay node R1 and the relay node R2 is calculated to be 70 seconds.

It is worth to note that when the speed of any relay node is greater than the speed of the subsequent mobile node while moving in the same direction as the subsequent mobile node, and the distance between the relay node and the subsequent mobile node is less than the transmission distance of the relay node, the connection state between the relay node and the subsequent mobile node is determined to be stable and there is no need for the relay node to transform into the proxy node.

Figure 8A:
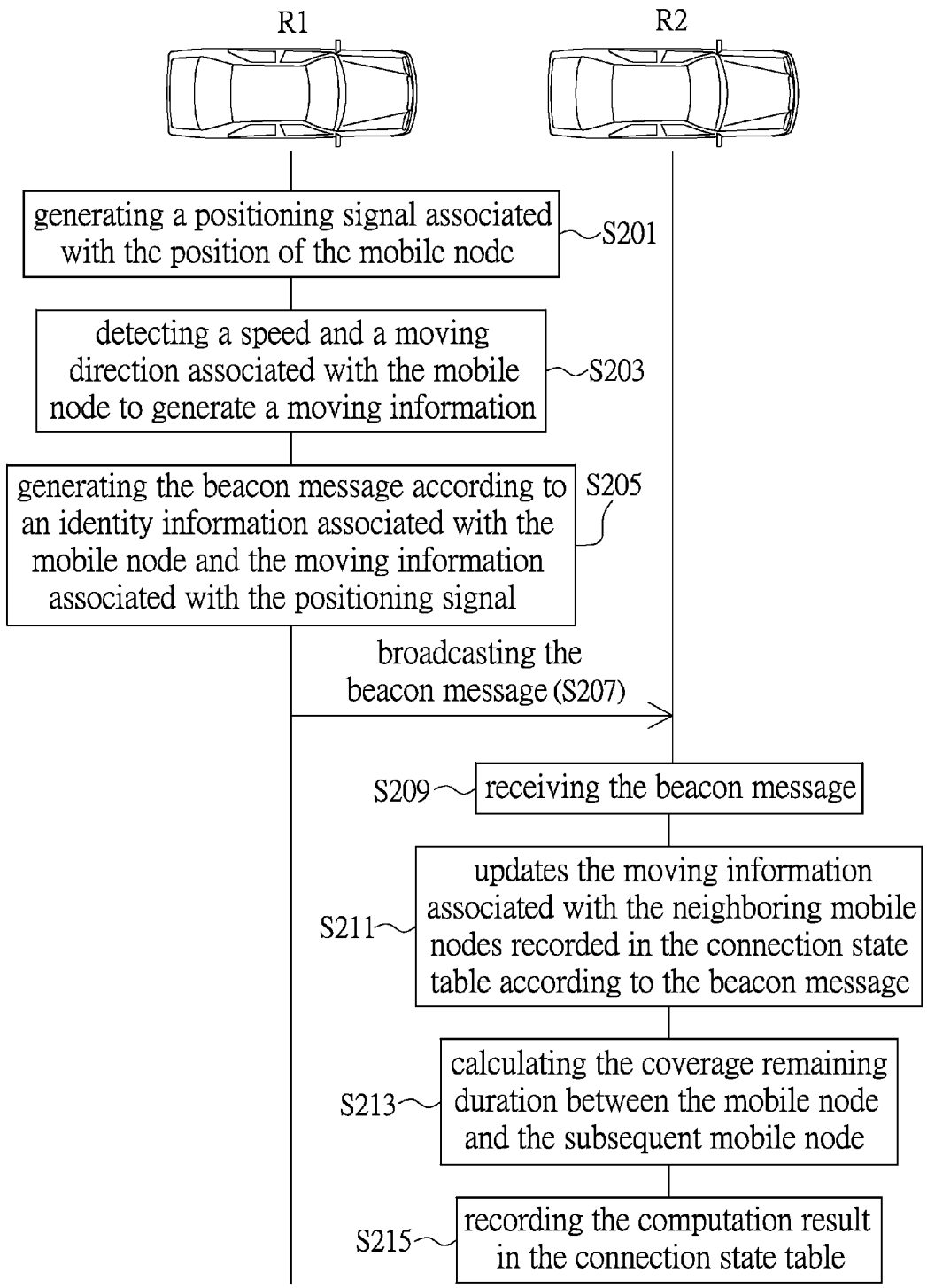
FIG. 8A is a flowchart illustrating a method for generating a beacon message and a method for updating a connection state table provided in accordance to the exemplary embodiment of the present disclosure.
Figure 8B:
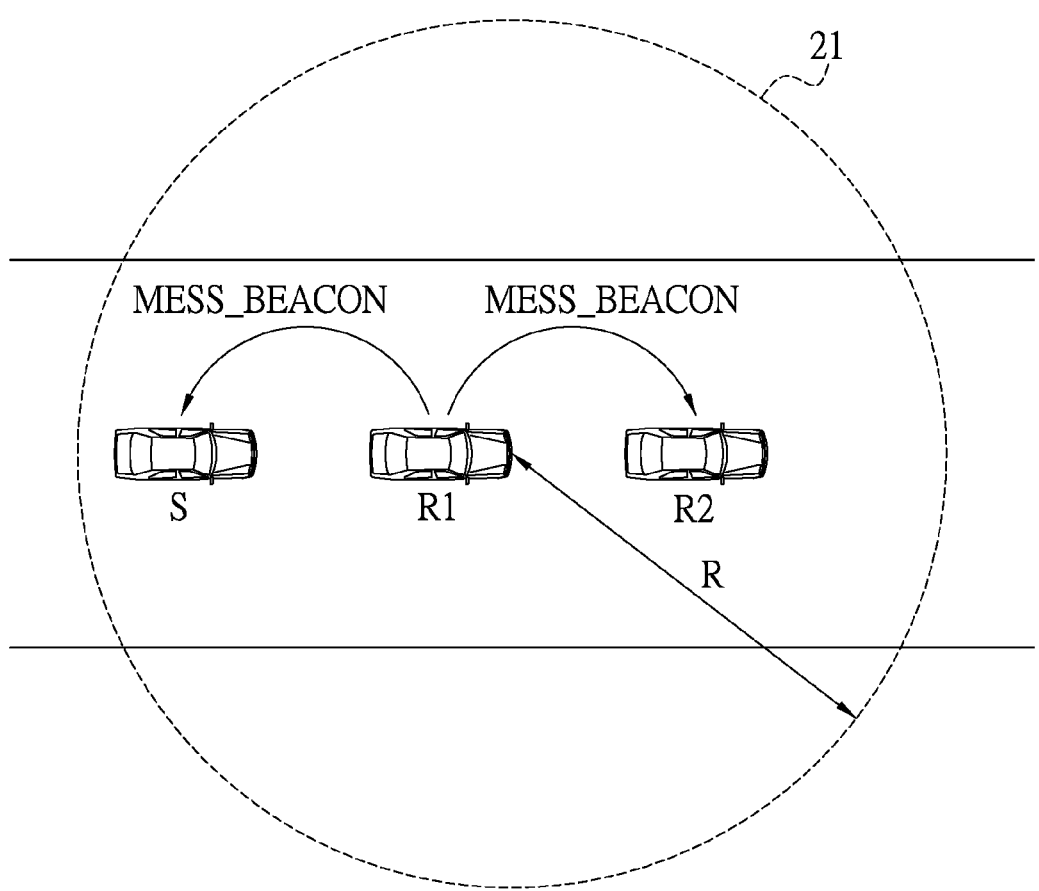
FIG. 8B is a diagram illustrating a broadcasting operation of the beacon message provided in accordance to the exemplary embodiment of the present disclosure.

Next, the present disclosure may further generalize a method for generating the beacon message, which is broadcasted by each of the mobile nodes and a method for updating the connection state table. Please refer to FIG. 8A and FIG. 8B in conjunction with FIG. 3. FIG. 8A shows a flowchart illustrating methods for generating a beacon message and updating a connection state table provided in accordance to the exemplary embodiment of the present disclosure. FIG. 8B shows a diagram illustrating the broadcasting operation of the beacon message provided in accordance to the exemplary embodiment of the present disclosure.

In Step S201, the processing unit 15 of the communication apparatus 10 of the relay node (i.e. the relay node R1) operatively drives the positioning module 11 to generate a positioning signal corresponding to the relay node (i.e. the relay node R1). In which, the positioning signal can includes the longitude and latitude coordinate data associated with the mobile node (i.e. the relay node R1).

In Step S203, the processing unit 15 of the communication apparatus 10 of the relay node (i.e. the relay node R1) operatively drives the speed detection module 12 to detect the speed and the moving direction of the mobile node (i.e. the relay node R1) to generate the mobility information. In Step S205, the processing unit 15 of the communication apparatus 10 of the relay node (i.e. the relay node R1) operatively generates the beacon message MESS_BEACON based on the identity information (e.g., the license plate, the vehicle number, the serial number of the communication apparatus 10, or the like.), the positioning signal, and the mobility information associated with the mobile node (i.e. the relay node R1). In Step S207, the processing unit 15 of the communication apparatus 10 of the relay node (i.e. the relay node R1) may drives the communication module 16 to broadcast the beacon message MESS_BEACON to each of the neighboring mobile nodes (e.g., the relay node R2). The broadcasting operation of the mobile node (i.e. the relay node R1) is illustrated in FIG. 8B. It is worth to note that as described, the source node S and the relay node R2 neighboring to the relay node R1 may receive the beacon message MESS_BEACON at the same time or at the different time depend upon the distances between the relay node R1 and each of the neighboring mobile nodes (i.e., the source node S and the relay node R2).

When the processing unit 15 of the communication apparatus 10 of each of the neighboring mobile nodes (e.g., the relay node R2) receives the beacon message MESS_BEACON broadcasted from the mobile node (i.e. the relay node R1), the processing unit 15 updates the mobility information of the mobile node (i.e. the relay node R1) in the connection state table stored in the memory unit 14 of the communication apparatus 10 based on the mobility information of the mobile node (i.e. the relay node R1) extracted from the beacon message MESS_BEACON (Step S209 and Step S211).

In Step S213, the processing unit 15 of the communication apparatus 10 of each of the neighboring mobile nodes (e.g., the relay node R2) operatively select equation (1) or equation (2) to calculate the coverage remaining duration CRD(R1, R2) between the mobile node itself (i.e. the relay node R1) and each of the neighboring mobile nodes (e.g., the relay node R2) according to the mobility information of the mobile node (i.e. the relay node R1).

In Step S215, each of the neighboring mobile nodes (e.g., the relay node R2) records the coverage remaining duration CRD(R1, R2) between the mobile node (i.e. the relay node R1) itself and each of the neighboring mobile nodes (e.g., the relay node R2) in the connection state table based on the computation result.

Figure 9A:
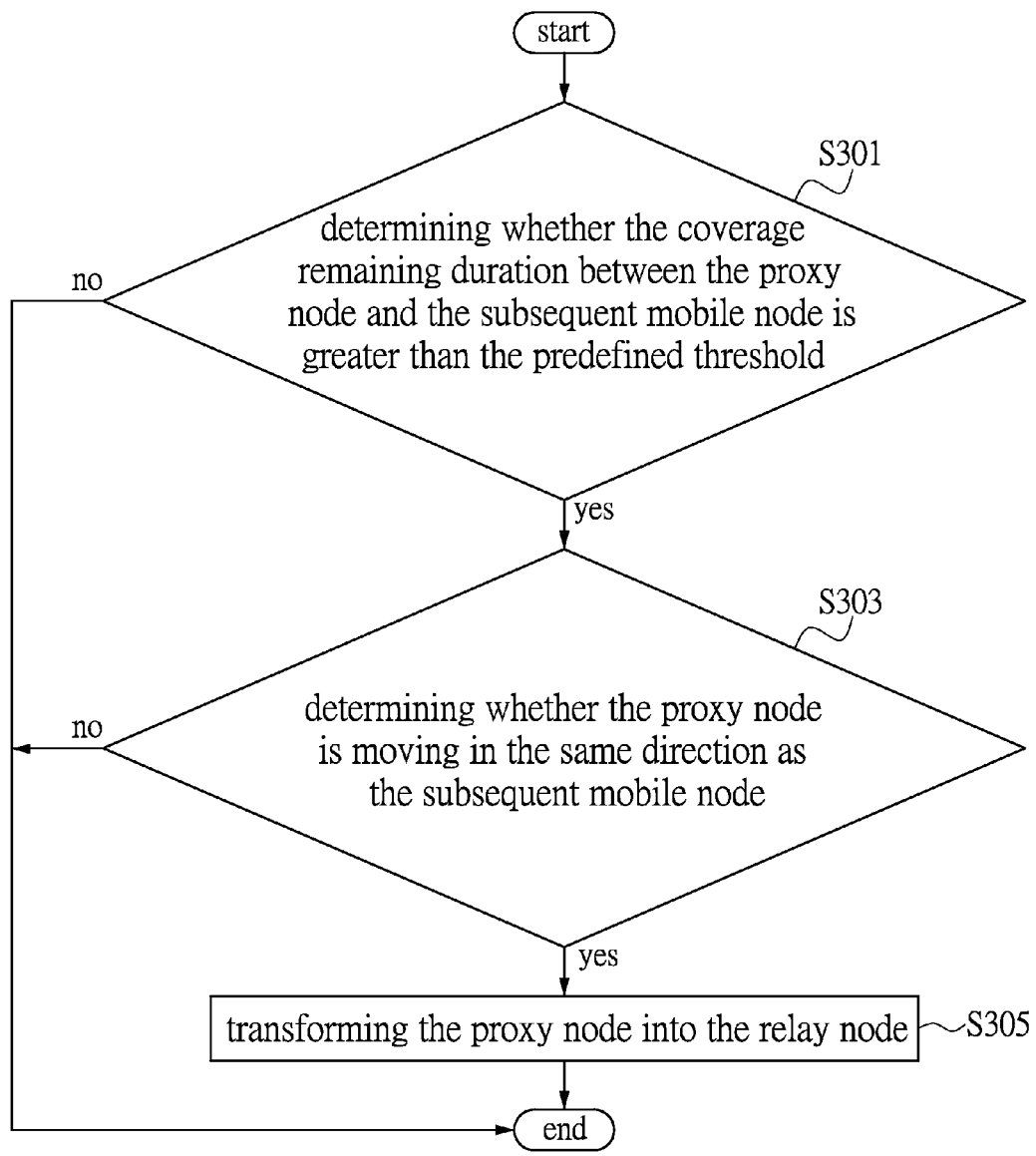
FIG. 9A is a flowchart illustrating a method of transforming the proxy node into the relay node provided in accordance to the exemplary embodiment of the present disclosure.
Figure 9B:
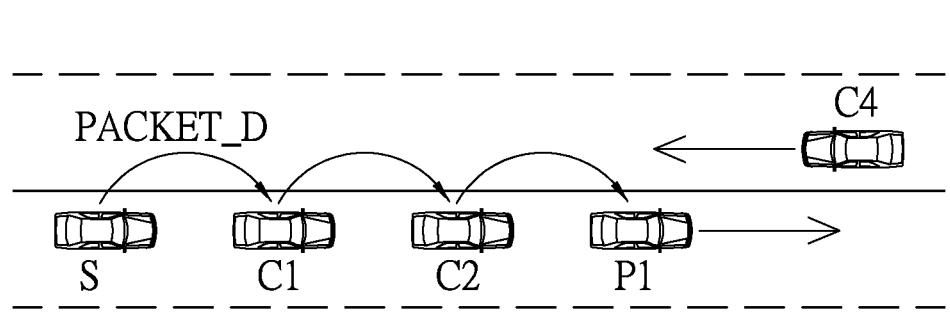
FIG. 9B is a diagram illustrating a packet transmission operation of the mobile node provided in accordance to the exemplary embodiment of the present disclosure.

Next, the present disclosure further generalizes a method for transforming the proxy node into the relay node while the VANET system is in operation. Please refer to FIG. 9A and FIG. 9B. FIG. 9A shows a flowchart illustrating a method of transforming the proxy node into the relay node provided in accordance to the exemplary embodiment of the present disclosure. FIG. 9B shows a diagram illustrating a packet transmission operation of the mobile node provided in accordance to the exemplary embodiment of the present disclosure.

In Step S301, any proxy node (e.g., the proxy node P1) can actively determines whether the coverage remaining duration CRD(P1, R4) between the proxy node (e.g., the proxy node P1) itself and the subsequent mobile node (e.g., the relay node R4) is greater than the predefined threshold TH according to the connection state table thereof upon receiving the data packet PACKET_D, or after every predefined time interval. When the proxy node (e.g., the proxy node P1) determines that the coverage remaining duration CRD(P1, R4) between the proxy node (e.g., the proxy node P1) itself and the subsequent mobile node (e.g., the relay node R4) is greater than the predefined threshold TH according to the connection state table thereof, executes Step S303. Conversely, when the proxy node (e.g., the proxy node P1) determines that the coverage remaining duration CRD(P1, R4) between the proxy node (e.g., the proxy node P1) and the subsequent mobile node (e.g., the relay node R4) is less than the predefined threshold TH according to the connection state table thereof, indicating that the connection between the proxy node (e.g., the proxy node P1) and the subsequent mobile node (e.g., the relay node R4) is unstable, the proxy node continue to operate as the proxy node.

In Step S303, the proxy node (e.g., the proxy node P1) determines whether the moving direction of the proxy node (e.g., the proxy node P1) is the same as the moving direction of the subsequent mobile node (e.g., the relay node R4) according to the connection state table thereof.

When the proxy node (e.g., the proxy node P1) determines that the moving direction of the proxy node (e.g., the proxy node P1) is the same as the subsequent mobile node (e.g., the relay node R4) according to the connection state table thereof, executes Step S305. Conversely, when the proxy node (e.g., the proxy node P1) determines that the proxy node (e.g., the proxy node P1) and the subsequent mobile node (e.g., the relay node R4) are moving in different directions according to the connection state table, the proxy node continue to operate as the proxy node, as shown in FIG. 9B.

In Step S305, the proxy node (e.g., the proxy node P1) transforms into the relay node. Specifically, the proxy node (e.g., the proxy node P1) respectively transmits the notification packet to the preceding and the subsequent mobile nodes. The proxy node (e.g., the proxy node P1) then transforms into the relay node after received the confirmation packets from the preceding and the subsequent mobile nodes, respectively.

Figure 10:
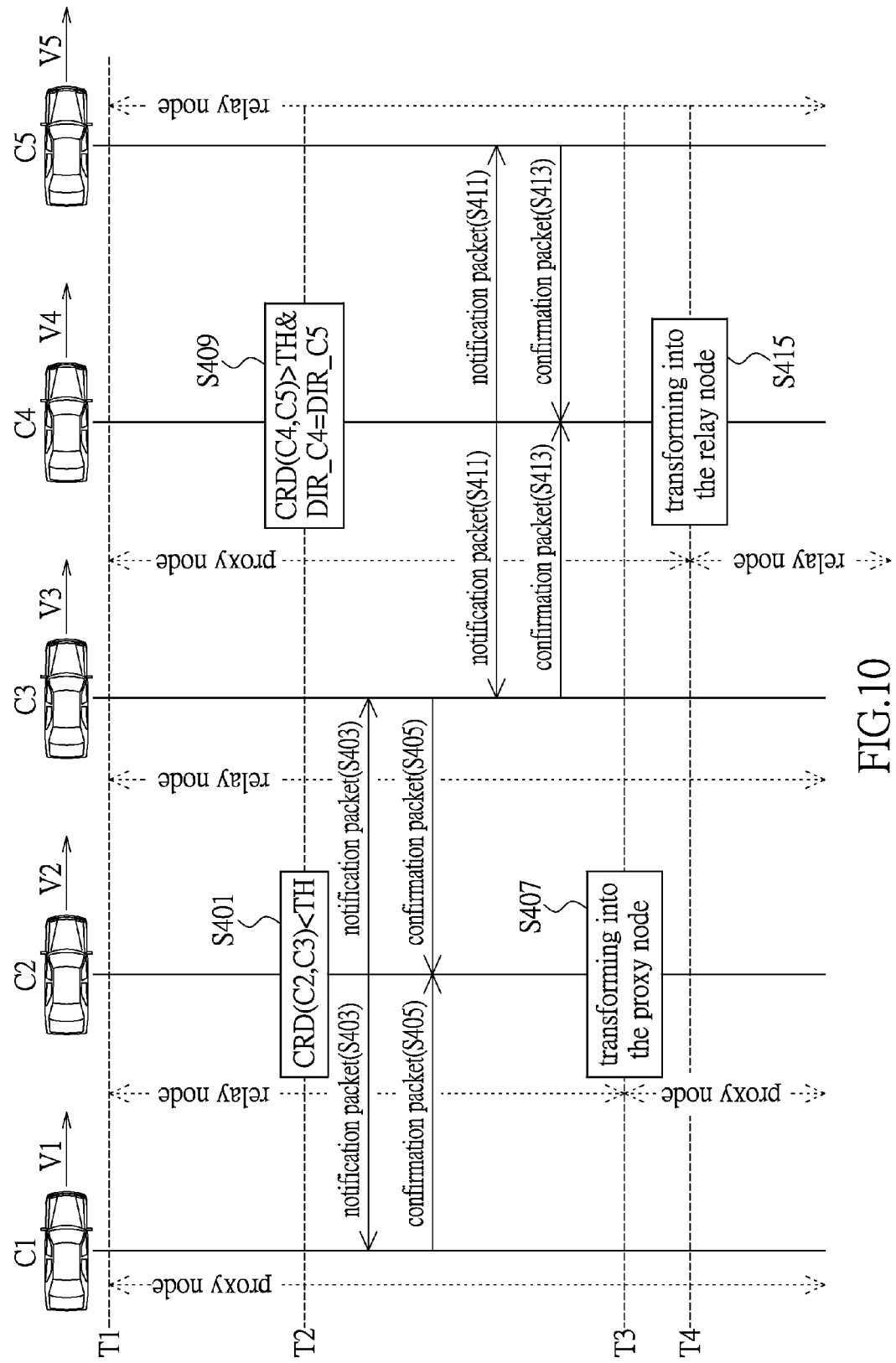
FIG. 10 is a diagram illustrating an operation of the VANET system provided in accordance to the exemplary embodiment of the present disclosure.

Next, please refer to FIG. 10, FIG. 10 shows a diagram illustrating an operation of the VANET system provided in accordance to the exemplary embodiment of the present disclosure. The mobile nodes of the VANET system are represented by vehicles C1~C5. The moving directions of the vehicles C1~C5 are same. Each of the vehicles C1~C5 has a communication apparatus with communication capability (not shown in FIG. 10) installed therein. The speed of the vehicle C1 is V1; the speed of the vehicle C2 is V2; the speed of the vehicle C3 is V3; the speed of the vehicle C4 is V4; the speed of the vehicle C5 is V5.

From time point T1 to time point T2, vehicles C1 and C4 operates as the proxy node and divide the network connection between the source node (not shown in FIG. 10) and the destination node (not shown in FIG. 10). Each of the vehicles C2, C2, and C6 operates as the relay node. Each of the vehicles C1~C5 periodically broadcasts the beacon message to each of the neighboring vehicles. Each of the vehicles C1~C5 correspondingly updates the mobility information associated with each vehicle as well as the coverage remaining duration between the vehicle and each of the neighboring vehicles in the connection state table thereof after received the beacon message broadcasted by each of the neighboring vehicles.

At time point T2, the vehicle C2 operatively determines that the coverage remaining duration CRD(C2,C3) between the vehicle C2 and the vehicle C3 is less than the predefined threshold TH according to the connection state table (Step S401).

In Step S403, the vehicle C2 respectively transmits the notification packet to the vehicle C1 and C3 to inform vehicle C1 and C3 that the vehicle C2 is transforming into the proxy node. The vehicle C1 and the vehicle C3 transmit the confirmation packets to the vehicle C2 respectively in response to the notification packet received (Step S405). The vehicle C2 may receive the confirmation packets transmitted by the vehicle C1 and the vehicle C3 at the same time. Or the vehicle C2 may receive the confirmation packets sent from vehicles C1 and C3 at different time point (e.g., there is a delay between the confirmation packets) as the distance between vehicles C1 and C2 may be different from the distance between vehicles C2 and C3.

At time point T3, the vehicle C2 has respectively received the confirmation packet transmitted from the vehicle C1 and the vehicle C3. In Step S407, the vehicle C2 transforms into the proxy node. The vehicle C2 reestablishes the reliable network connection with the subsequent proxy node or the destination node.

Similarly, at time point T2, the vehicle C4 operatively determines that the coverage remaining duration CRD(C4, C5) between the vehicle C4 and the vehicle C5 is greater than the predefined threshold TH according to the connection state table (Step S409). When the vehicle C4 determines that the moving direction DIR_C4 of the vehicle C4 is the same as the moving direction DIR_C5 of the vehicle C5, the vehicle C4 transmits the notification packets to the vehicle C3 and the vehicle C5, respectively to inform vehicles C3 and C5 that the vehicle C4 is transforming into the relay node (Step S411).

In Step S413, the vehicle C3 and the vehicle C5 respectively transmit the confirmation packets to the vehicle C4 in response of receiving the notification packet. The vehicle C4 may receive the confirmation packets transmitted from the vehicle C3 and the vehicle C5 at the same time. Or the vehicle C4 may receive the confirmation packets sent from vehicles C3 and C5 at different time point (e.g., there is a delay between the confirmation packets) as the distance between vehicles C3 and C4 may be different from the distance between vehicles C4 and C5. At time point T4, the vehicle C4 has respectively received the confirmation packet transmitted from the vehicle C3 and the vehicle C5. In Step S415, the vehicle C4 transforms into the relay node.

Each mobile node in the disclosed VANET system is operable to adapt to the instantaneous change of the network environment of the VANET i.e. the mobile node is operable to transform into the relay node or the proxy node to adaptively configure the network topology of the VANET system and divide the network connection between the source node and the destination node into multiple sub-connections when necessary. Accordingly, the operational stability and reliability of the packet transmission of the VANET system can be greatly improved.

Figure 11:
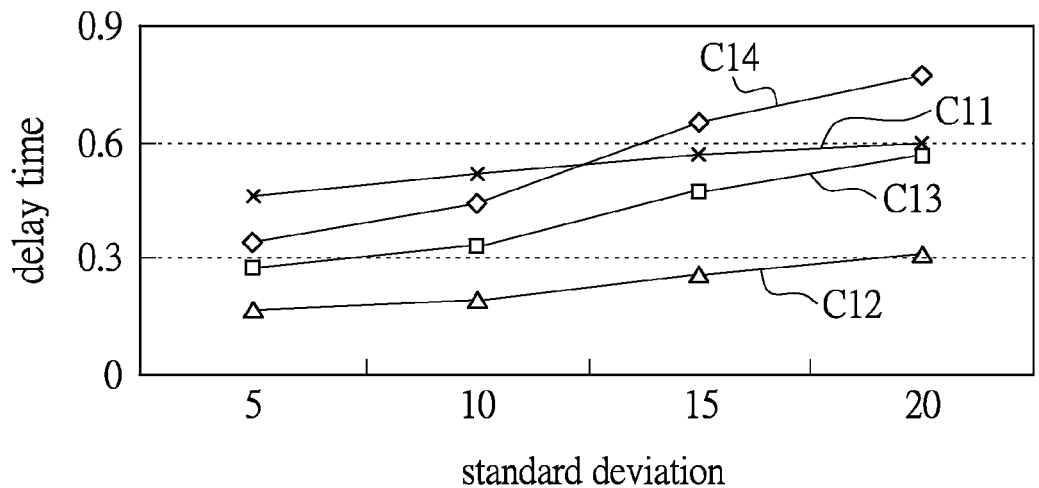
FIG. 11 is a diagram illustrating a relationship between the delay time associated with the data packet and different predefined thresholds configured for the VANET system provided in accordance to the exemplary embodiment of the present disclosure.

Please refer to FIG. 11, FIG. 11 shows a diagram illustrating a relationship between the delay time associated with the data packet and different predefined thresholds configured for the VANET system provided in accordance to the exemplary embodiment of the present disclosure. Curve C11 represents the delay time curve associated with the packet transmission using the conventional split-TCP protocol. Curve C12 represents the delay time curve associated with the packet transmission using the split reliable transmission protocol with the predefined threshold configured to be one second. Curve C13 represents the delay time curve associated with the packet transmission using the split reliable transmission protocol with the predefined threshold configured to be two seconds. Curve C13 represents the delay time curve associated with the packet transmission using the split reliable transmission protocol with the predefined threshold configured to be three seconds.

It can be noted from FIG. 11, when the higher the predefined threshold is, the more number of proxy nodes used in the network connection established between the source node and the destination node of the VANET system. The delay time associated with the packet transmitted from the source node to the destination node is therefore longer. The lower the predefined threshold is, the less number of the proxy nodes used in the network connection established between the source node and the destination node of the VANET system. The delay time associated with the packet transmitted from the source node to the destination node is therefore shorter.

In addition, when the predefined threshold is configured to be 2 or 3 seconds, the end-end delay incurred during the packet transmission in the VANET system using the split reliable transmission protocol of the present disclosure is lower than the delay generated in the VANET system using the conventional split-TCP protocol. Thus, the split reliable transmission protocol of the present disclosure, can adaptively adjust the end-end delay associated with packet transmission incurred in the VANET system through selecting appropriate predefined threshold.

Figure 12:
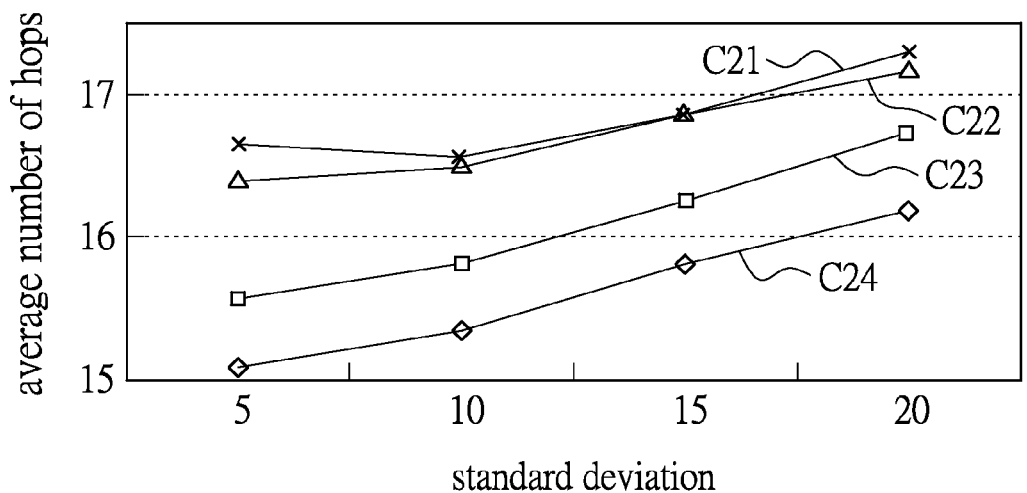
FIG. 12 is a diagram illustrating of a relationship between the number of hops associated with the data packet and different predefined thresholds configured for the VANET system provided in accordance to the exemplary embodiment of the present disclosure.

Please refer to FIG. 12, which shows a diagram illustrating a relationship between numbers of hops associated with the transmission of the data packet and different predefined thresholds configured for in the VANET system provided in accordance according to the exemplary embodiment of the present disclosure. Curve C21 represents the average number of hops associated with the packet transmission using the conventional split-TCP protocol. Curve C22 represents the average number of hops associated with the packet transmission using the split reliable transmission protocol with the predefined threshold configured to be one second. Curve C23 represents the average number of hops associated with the packet transmission using the split reliable transmission protocol with the predefined threshold configured to be two seconds. Curve C24 represents the average number of hops associated with the packet transmission using the split reliable transmission protocol with the predefined threshold configured to be three seconds.

It can be noted from FIG. 12, the higher the predefined threshold is, the more number of the proxy nodes used in the network connection established between the source node and the destination node in the VANET system. The number of hops used for packet retransmission is less in the event of packet transmission failure so is the average number of hops associated with the packet transmission in the VANET system. The lower the predefined threshold is, the less number of the proxy nodes but more number of relay nodes used in the network connection established between the source node and the destination node in the VANET system, thereby increase the average number of hops associated with the packet transmission in the VANET system. When the predefined threshold is configured to be 2 or 3 seconds, the average number of hops associated with the packet transmission in the VANET system using the split reliable transmission protocol will be less than the average number of hops associated with the packet transmission in the VANET system using the conventional split-TCP protocol.

Since by convention, the packet loss rate can be lowered with less number of hops used for the packet transmission. Thus, the split reliable transmission protocol provided herein can through properly select the threshold, improve the overall throughput of the VANET system. Moreover, the split reliable transmission protocol can also solve the issue of the channel capturing effect and network congestion, thereby further enhances the performance for the VANET system. Accordingly, the transmission speed and the network performance of the VANET system using the split reliable transmission protocol are higher in comparison to the VANET system using the conventional split-TCP protocol.

It can be noted from both FIG. 11 and FIG. 12, it is preferably to configure the aforementioned predefined threshold as 2 or 3 seconds. However, it is shall be noted that the predefined threshold in practice may be configured according to the operational requirements and the network environment of the VANET system.

In summary, exemplary embodiments of the present disclosure provide a transmission control method for a VANET system, a communication apparatus of a mobile node, and a VANET system. The transmission control method can actively determine whether to divide the network connection established between the source node and the destination node into at least one sub-connection by employing proxy nodes wherever necessary according to the network topology of the VANET system (e.g., the mobility information of the mobile node) for adapting to the instantaneous changing of the operational environment in the VANET. The transmission control method can further estimate the coverage remaining durations (CRD) between neighboring mobile nodes based on the position, the moving direction, and the speed of the mobile nodes and dynamically configure the transmission length in each sub-connection. Thereby, reduce the transmission failure rate of the point-to-point transmission as well as resolve the network congestion issue found in the prior technology.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A transmission control method for a vehicular ad hoc network system, the vehicular ad hoc network system having a plurality of mobile nodes with communication capability, wherein the mobile nodes comprise a source node, a destination node, and a plurality of relay nodes, the transmission control method comprising:

each of the mobile nodes periodically broadcasting a beacon message which includes a mobility information;

each of the mobile nodes receiving the beacon message that is broadcasted from each of the neighboring mobile nodes, and correspondingly updating a connection state table associated with each of the mobile nodes according to the beacon message, wherein the connection state table records a coverage remaining duration between each mobile node and each of the neighboring mobile nodes;

establishing a network connection between the source node and the destination node such that the source node transmits a data packet to the destination node through the relay nodes;

each of the relay nodes determining whether the coverage remaining duration between the relay node and the subsequent mobile node is less than a predefined threshold according to the connection state table upon receiving the data packet; and when determined that the coverage remaining duration is less than the predefined threshold, the relay node transforms into a proxy node, stores the data packet, and establishes a first sub-connection with a subsequent proxy node or the destination node;

wherein the step of calculating the coverage remaining duration comprises:

when the relay node determines that the speed thereof is less than the speed of the subsequent mobile node according to the connection state table, the relay node calculates the coverage remaining duration using equation (1):

$$CRD = \frac{R - |\overline{P_1} - \overline{P_2}|}{|\overline{V_1} - \overline{V_2}|} \quad (1)$$

wherein, CRD represents the coverage remaining duration; R represents the transmission distance of the relay node; $\overline{P_1}$ represents the position vector of the relay node; $\overline{P_2}$ represents the position vector of the subsequent mobile node; $\overline{V_1}$ represents the velocity vector of the relay node; the $\overline{V_2}$ represents the velocity vector of the subsequent mobile node; and when the relay node determines that the speed thereof is greater than the speed of the subsequent mobile node according to the connection state table, the relay node calculates the coverage remaining duration using equation (2):

$$CRD = \frac{R + |\overline{P_1} - \overline{P_2}|}{|\overline{V_1} - \overline{V_2}|} \quad (2)$$

wherein CRD represents the coverage remaining duration; R represent the transmission distance of the relay node; $\overline{P_1}$ represents the position vector of the relay node; $\overline{P_2}$ represents the position vector of the subsequent mobile node; $\overline{V_1}$ represents the velocity vector of the relay node; the $\overline{V_2}$ represents the velocity vector of the subsequent next mobile node.

2. The transmission control method according to claim 1, further comprising:
the proxy node determining whether the coverage remaining duration between the proxy node and the subsequent mobile node is greater than the predefined threshold according to the connection state table upon receiving another data packet;
when determined that the coverage remaining duration between the proxy node and the subsequent mobile node is greater than the predefined threshold, the proxy node determines whether the moving direction of the proxy node is the same as the moving direction of the subsequent mobile node; and
when determined that the moving direction of the proxy node is the same as the moving direction of the subsequent mobile node, the proxy node transforms into the relay node and forwards the data packet to the subsequent mobile node.

3. The transmission control method according to claim 1, wherein before the relay node transforms to the proxy node, the transmission control method further comprises:
after determining the relay node transforms to the proxy node, storing the data packet in a memory unit of the proxy node, transmitting a notification packet to the preceding mobile node and the subsequent mobile node, respectively; and
after transmitting the notification packet to the preceding mobile node and the subsequent mobile node, respectively, the relay node transforming to the proxy node;
wherein after the relay node transformed into the proxy node, the transmission control method further comprises:
storing the data packet in a memory unit of the proxy node;
establishing the first sub-connection between the proxy node and the subsequent proxy node or the destination node and a second sub-connection between the proxy node and the preceding proxy node or the source node;
the proxy node forwarding the data packet to the subsequent proxy node or the destination node through the first sub-connection; and
the proxy node removing the data packet from the memory unit upon receiving an acknowledgment packet corresponding to the data packet, wherein the acknowledgment packet is transmitted by the subsequent proxy node or the destination node.

4. The transmission control method according to claim 3, wherein the step after the relay node transformed into the proxy node, further comprises:
when the proxy node does not receive the acknowledgment packet corresponding to the data packet within a period of time after transmitted the data packet to the subsequent proxy node or the destination node, the proxy node retransmits the data packet to the subsequent proxy node or the destination node.

5. The transmission control method according to claim 1, further comprising:
each of the proxy nodes determining whether the coverage remaining duration between the proxy node and the subsequent mobile node is greater than the predefined threshold, and whether the moving direction of the proxy node is the same as the moving direction of the subsequent mobile node after every predefined time interval, so as to determine whether to transform the proxy node into the relay node.

6. The transmission control method according to claim 1, wherein further comprises:
each of the relay nodes operatively determining whether the coverage remaining duration between the relay node and the subsequent mobile node is less than the predefined threshold according to the connection state table after every predefined time interval, and transforming the relay node into the proxy node when determined that the coverage remaining duration is less than the predefined threshold.

7. The transmission control method according to claim 1, wherein the beacon message comprises of an identity information associated with the mobile node, a positioning information of the mobile node, a speed of the mobile node, and a moving direction of the mobile node.

8. The transmission control method according to claim 1, wherein the relay node calculates the coverage remaining duration between the relay node and the subsequent mobile node based on a distance between the relay node and the subsequent mobile node and a relative speed therebetween.

9. The transmission control method according to claim 1, wherein the relay node calculates the coverage remaining duration between the relay node and the subsequent mobile node based on the transmission distance of the relay node, the distance between the relay node and the subsequent mobile node, and the speed of the relay node.

10. A communication apparatus for a mobile node of a vehicular ad hoc network system, the communication apparatus comprising:
a positioning module, operatively generating a positioning signal associated with the location of the mobile node;
a speed detection module, operatively detecting a speed of the mobile node and generating a speed data;
a connection state table, stored in a memory unit and configured for recording a coverage remaining duration between the mobile node and each of the neighboring mobile nodes;
a communication module, operatively receiving or transmitting a data packet being generated by a source node in the vehicular ad hoc network system; and
a processing unit, coupled to the positioning module, the speed detection module, the memory unit, and the communication module, the processing unit operatively generating a beacon message periodically based on the positioning signal and the speed data, and periodically broadcasting the beacon message using the communication module;

wherein the processing unit calculates and updates the coverage remaining duration between the mobile node and each of the neighboring mobile nodes recorded in the connection state table after received the beacon message being broadcasted by each of the neighboring mobile nodes;

wherein when the mobile node is a relay node, the processing unit operatively determines whether the coverage remaining duration between the mobile node and the subsequent mobile is less than a predefined threshold according to the connection state table upon receiving the data packet from the communication module for determining whether to transform the relay node into a proxy node;

wherein the step of calculating the coverage remaining duration comprises:

when the relay node determines that the speed thereof is less than the speed of the subsequent mobile node according to the connection state table, the relay node calculates the coverage remaining duration using equation (1):

$$CRD = \frac{R - |\overline{P_1} - \overline{P_2}|}{|\overline{V_1} - \overline{V_2}|} \quad (1)$$

wherein, CRD represents the coverage remaining duration; R represents the transmission distance of the relay node; $\overline{P_1}$ represents the position vector of the relay node; $\overline{P_2}$ represents the position vector of the subsequent mobile node; $\overline{V_1}$ represents the velocity vector of the relay node; the $\overline{V_2}$ represents the velocity vector of the subsequent mobile node; and when the relay node determines that the speed thereof is greater than the speed of the subsequent mobile node according to the connection state table, the relay node calculates the coverage remaining duration using equation (2):

$$CRD = \frac{R + |\overline{P_1} - \overline{P_2}|}{|\overline{V_1} - \overline{V_2}|} \quad (2)$$

wherein CRD represents the coverage remaining duration; R represent the transmission distance of the relay node; $\overline{P_1}$ represents the position vector of the relay node; $\overline{P_2}$ represents the position vector of the subsequent mobile node; $\overline{V_1}$ represents the velocity vector of the relay node; the $\overline{V_2}$ represents the velocity vector of the subsequent next mobile node.

11. The communication apparatus according to claim 10, wherein when the processing determines that the coverage remaining duration between the mobile node and the subsequent mobile node is less than the predefined threshold, the processing transforms the relay node into the proxy node and transmits a notification packet to the preceding mobile node and the subsequent mobile node, respectively, before transforming the relay node into the proxy node.

12. The communication apparatus according to claim 11, wherein when the processing unit transforms the mobile node into the proxy node, the processing unit stores the data packet in a temporary memory block of the memory unit, establishes a first sub-connection between the mobile node and the subsequent proxy node or a destination node for forwarding the data packet to the subsequent proxy node or the destination node, and establishes a second sub-connection between the mobile node and the subsequent proxy node or the destination node.

13. The communication apparatus according to claim 12, wherein when the processing unit receives an acknowledgment packet corresponding to the data packet being sent from the subsequent proxy node or the destination node through the first sub-connection, the processing unit removes the data packet from the temporary memory block of the memory unit.

14. The communication apparatus according to claim 10, wherein the beacon message comprises an identity information associated with the mobile node, a positioning information of the mobile node, a speed of the mobile node, and a moving direction of the mobile node.

15. The communication apparatus according to claim 10, wherein the relay node calculates the coverage remaining duration between the relay node and the subsequent mobile node based on a distance between the relay node and the subsequent mobile node and a relative moving speed therebetween.

16. The communication apparatus according to claim 10, wherein after the mobile node has transformed into the proxy node, the processing unit operatively determines whether the coverage remaining duration between the proxy node and the subsequent mobile node is greater than the predefined threshold, and whether the moving direction of the proxy node is the same as the moving direction of the subsequent mobile node according to the connection state table after every a predefined time interval; when the processing unit determines that the coverage remaining duration between the proxy node and the subsequent mobile node is greater than the predefined threshold, and the moving direction of the proxy node is the same as the moving direction of the subsequent mobile node, the processing unit transforms the proxy node into the relay node.

* * * * *